(12) United States Patent
Thorwirth et al.

(10) Patent No.: US 10,591,984 B2
(45) Date of Patent: *Mar. 17, 2020

(54) SYSTEMS AND METHODS FOR RAPID CONTENT SWITCHING TO PROVIDE A LINEAR TV EXPERIENCE USING STREAMING CONTENT DISTRIBUTION

(71) Applicant: Verimatrix, Inc., San Diego, CA (US)

(72) Inventors: Niels J. Thorwirth, San Diego, CA (US); Timothy J. Driscoll, San Diego, CA (US)

(73) Assignee: Verimatrix, Inc., San Diego, CA (US)

( * ) Notice: Subject to any disclaimer, the term of this patent is extended or adjusted under 35 U.S.C. 154(b) by 252 days.

This patent is subject to a terminal disclaimer.

(21) Appl. No.: 15/706,264

(22) Filed: Sep. 15, 2017

(65) Prior Publication Data
US 2018/0129273 A1 May 10, 2018

Related U.S. Application Data

(63) Continuation of application No. 13/945,871, filed on Jul. 18, 2013, now Pat. No. 9,804,668.
(Continued)

(51) Int. Cl.
*H04N 21/6587* (2011.01)
*H04N 21/433* (2011.01)
(Continued)

(52) U.S. Cl.
CPC .............. *G06F 3/01* (2013.01); *G11B 27/105* (2013.01); *H04L 65/1086* (2013.01);
(Continued)

(58) Field of Classification Search
None
See application file for complete search history.

(56) References Cited

U.S. PATENT DOCUMENTS

| 5,361,332 A | 11/1994 | Yoshida et al. |
| 5,404,436 A | 4/1995 | Hamilton |

(Continued)

FOREIGN PATENT DOCUMENTS

| EP | 0813167 A2 | 12/1997 |
| EP | 1056273 A2 | 11/2000 |

(Continued)

OTHER PUBLICATIONS

"Amazon Fire TV," Amazon, Retrieved from http://www.amazon.com/gp/product/B00CX5P8FC on Sep. 29, 2014, 19 pgs.
(Continued)

*Primary Examiner* — Nicholas Klicos
(74) *Attorney, Agent, or Firm* — KPPB LLP

(57) ABSTRACT

Systems and methods for rapid content switching between pieces of content presented in a plurality of stations using streaming content distribution in accordance with embodiments of the invention are disclosed. One embodiment includes processing a portion of a station manifest that includes identifiers for content stations and identifiers for pieces of content associated with content stations, selecting jump points that are associated with specific locations within pieces of content, determining a current content station, playing a portion of a current piece of content associated with the current content station, determining alternative pieces of content using the station manifest, preparing additional content for playback at each of the jump points by preparing alternative pieces of content during playback of the current content, receiving a user instruction during playback, selecting a target jump point based upon the user instruction, and commencing playback of additional content starting from the target jump point.

20 Claims, 9 Drawing Sheets

Related U.S. Application Data

(60) Provisional application No. 61/673,177, filed on Jul. 18, 2012.

(51) Int. Cl.
| | |
|---|---|
| *G11B 27/10* | (2006.01) |
| *G06F 3/01* | (2006.01) |
| *H04N 21/462* | (2011.01) |
| *H04N 21/643* | (2011.01) |
| *H04N 21/482* | (2011.01) |
| *H04N 21/442* | (2011.01) |
| *H04N 21/45* | (2011.01) |
| *H04L 29/06* | (2006.01) |

(52) U.S. Cl.
CPC ...... *H04L 65/4076* (2013.01); *H04L 65/4084* (2013.01); *H04L 65/4092* (2013.01); *H04N 21/4332* (2013.01); *H04N 21/44209* (2013.01); *H04N 21/4532* (2013.01); *H04N 21/4621* (2013.01); *H04N 21/4622* (2013.01); *H04N 21/4821* (2013.01); *H04N 21/64322* (2013.01); *H04N 21/6587* (2013.01); *H04N 21/482* (2013.01)

(56) References Cited

U.S. PATENT DOCUMENTS

| | | | |
|---|---|---|---|
| 5,589,993 A | 12/1996 | Naimpally et al. | |
| 5,717,816 A | 2/1998 | Boyce et al. | |
| 6,031,622 A | 2/2000 | Ristow et al. | |
| 6,038,257 A | 3/2000 | Brusewitz et al. | |
| 6,155,840 A | 12/2000 | Sallette | |
| 6,195,388 B1 | 2/2001 | Choi et al. | |
| 6,658,056 B1 | 12/2003 | Duruöz et al. | |
| 6,771,703 B1 | 8/2004 | Oguz et al. | |
| 6,807,306 B1 | 10/2004 | Girgensohn et al. | |
| 6,850,252 B1 | 2/2005 | Hoffberg | |
| 6,859,496 B1 | 2/2005 | Boroczky et al. | |
| 6,956,901 B2 | 10/2005 | Boroczky et al. | |
| 7,023,924 B1 | 4/2006 | Keller et al. | |
| 7,197,234 B1 | 3/2007 | Chatterton | |
| 7,242,772 B1 | 7/2007 | Tehranchi | |
| 7,319,806 B1 | 1/2008 | Willner et al. | |
| 7,478,325 B2 | 1/2009 | Foehr | |
| 7,689,510 B2 | 3/2010 | Lamkin et al. | |
| 7,779,097 B2 | 8/2010 | Lamkin et al. | |
| 7,974,714 B2 | 7/2011 | Hoffberg | |
| 7,991,156 B1 | 8/2011 | Miller | |
| 7,996,872 B2* | 8/2011 | Levy | H04N 21/234318 348/553 |
| 8,023,562 B2 | 9/2011 | Zheludkov et al. | |
| 8,046,453 B2 | 10/2011 | Olaiya | |
| 8,054,880 B2 | 11/2011 | Yu et al. | |
| 8,069,260 B2 | 11/2011 | Speicher et al. | |
| 8,225,061 B2 | 7/2012 | Greenebaum | |
| 8,233,768 B2 | 7/2012 | Soroushian et al. | |
| 8,249,168 B2 | 8/2012 | Graves | |
| 8,270,473 B2 | 9/2012 | Chen et al. | |
| 8,270,819 B2 | 9/2012 | Vannier | |
| 8,289,338 B2 | 10/2012 | Priyadarshi et al. | |
| 8,291,460 B1 | 10/2012 | Peacock | |
| 8,311,115 B2 | 11/2012 | Gu et al. | |
| 8,321,556 B1 | 11/2012 | Chatterjee et al. | |
| 8,321,905 B1 | 11/2012 | Streeter et al. | |
| 8,386,621 B2 | 2/2013 | Park | |
| 8,412,841 B1 | 4/2013 | Swaminathan et al. | |
| 8,456,380 B2 | 6/2013 | Pagan | |
| 8,472,792 B2 | 6/2013 | Butt | |
| 8,515,265 B2 | 8/2013 | Kwon et al. | |
| 8,516,529 B2 | 8/2013 | Lajoie et al. | |
| 8,520,055 B2 | 8/2013 | Sasaki et al. | |
| 8,520,056 B2 | 8/2013 | Sasaki et al. | |
| 8,606,069 B2 | 12/2013 | Okubo et al. | |
| 8,681,866 B1 | 3/2014 | Jia | |
| 8,774,609 B2 | 7/2014 | Drake et al. | |
| 8,782,267 B2* | 7/2014 | Gilson | H04N 5/765 709/231 |
| 8,832,297 B2 | 9/2014 | Soroushian et al. | |
| 8,843,586 B2 | 9/2014 | Pantos et al. | |
| 9,197,685 B2 | 11/2015 | Soroushian | |
| 9,294,526 B2 | 3/2016 | George et al. | |
| 9,804,668 B2 | 10/2017 | Thorwirth et al. | |
| 2002/0057898 A1 | 5/2002 | Normile | |
| 2002/0136231 A1 | 9/2002 | Leatherbury et al. | |
| 2002/0191959 A1 | 12/2002 | Lin et al. | |
| 2003/0002578 A1 | 1/2003 | Tsukagoshi et al. | |
| 2003/0152370 A1 | 8/2003 | Otomo et al. | |
| 2003/0163824 A1 | 8/2003 | Gordon et al. | |
| 2003/0231863 A1 | 12/2003 | Eerenberg et al. | |
| 2003/0231867 A1 | 12/2003 | Gates et al. | |
| 2003/0233464 A1 | 12/2003 | Walpole et al. | |
| 2003/0236836 A1 | 12/2003 | Borthwick | |
| 2003/0236907 A1 | 12/2003 | Stewart et al. | |
| 2004/0081434 A1 | 4/2004 | Jung et al. | |
| 2004/0136698 A1 | 7/2004 | Mock | |
| 2004/0158878 A1 | 8/2004 | Ratnakar et al. | |
| 2004/0220791 A1 | 11/2004 | Lamkin et al. | |
| 2004/0220926 A1 | 11/2004 | Lamkin et al. | |
| 2004/0223737 A1 | 11/2004 | Johnson | |
| 2005/0038826 A1 | 2/2005 | Bae et al. | |
| 2005/0114896 A1 | 5/2005 | Hug | |
| 2005/0193070 A1 | 9/2005 | Brown et al. | |
| 2005/0193322 A1 | 9/2005 | Lamkin et al. | |
| 2005/0204289 A1 | 9/2005 | Mohammed et al. | |
| 2005/0207442 A1 | 9/2005 | van Zoest et al. | |
| 2005/0207578 A1 | 9/2005 | Matsuyama et al. | |
| 2005/0229221 A1* | 10/2005 | Kerofsky | H04N 21/42607 725/100 |
| 2005/0273695 A1 | 12/2005 | Schnurr | |
| 2005/0275656 A1 | 12/2005 | Corbin et al. | |
| 2006/0045052 A1* | 3/2006 | Yoo | H04H 60/27 370/335 |
| 2006/0078301 A1 | 4/2006 | Ikeda et al. | |
| 2006/0129909 A1 | 6/2006 | Butt et al. | |
| 2006/0173887 A1 | 8/2006 | Breitfeld et al. | |
| 2006/0245727 A1 | 11/2006 | Nakano et al. | |
| 2006/0259588 A1 | 11/2006 | Lerman et al. | |
| 2006/0263056 A1 | 11/2006 | Lin et al. | |
| 2007/0031110 A1 | 2/2007 | Rijckaert | |
| 2007/0047901 A1 | 3/2007 | Ando et al. | |
| 2007/0053513 A1 | 3/2007 | Hoffberg | |
| 2007/0058928 A1 | 3/2007 | Naito et al. | |
| 2007/0083617 A1 | 4/2007 | Chakrabarti et al. | |
| 2007/0086528 A1 | 4/2007 | Mauchly et al. | |
| 2007/0136817 A1 | 6/2007 | Nguyen | |
| 2007/0140647 A1 | 6/2007 | Kusunoki et al. | |
| 2007/0154165 A1 | 7/2007 | Hemmeryckz-Deleersnijder et al. | |
| 2007/0168541 A1 | 7/2007 | Gupta et al. | |
| 2007/0168542 A1 | 7/2007 | Gupta et al. | |
| 2007/0180125 A1 | 8/2007 | Knowles et al. | |
| 2007/0239839 A1 | 10/2007 | Buday et al. | |
| 2007/0274679 A1 | 11/2007 | Yahata et al. | |
| 2007/0292107 A1 | 12/2007 | Yahata et al. | |
| 2008/0043832 A1 | 2/2008 | Barkley et al. | |
| 2008/0120389 A1 | 5/2008 | Bassali et al. | |
| 2008/0126248 A1 | 5/2008 | Lee et al. | |
| 2008/0137736 A1 | 6/2008 | Richardson et al. | |
| 2008/0138033 A1 | 6/2008 | Rodriguez et al. | |
| 2008/0172441 A1 | 7/2008 | Speicher et al. | |
| 2008/0192818 A1 | 8/2008 | DiPietro et al. | |
| 2008/0195744 A1 | 8/2008 | Bowra et al. | |
| 2008/0205860 A1 | 8/2008 | Holtman | |
| 2008/0256105 A1 | 10/2008 | Nogawa et al. | |
| 2008/0263354 A1 | 10/2008 | Beuque et al. | |
| 2008/0279535 A1 | 11/2008 | Haque et al. | |
| 2008/0310454 A1 | 12/2008 | Bellwood et al. | |
| 2008/0310496 A1 | 12/2008 | Fang | |
| 2008/0310814 A1 | 12/2008 | Bowra et al. | |
| 2008/0320521 A1* | 12/2008 | Beadle | G06Q 30/02 725/46 |
| 2009/0031220 A1 | 1/2009 | Tranchant et al. | |
| 2009/0043906 A1 | 2/2009 | Hurst | |

(56) References Cited

U.S. PATENT DOCUMENTS

| | | |
|---|---|---|
| 2009/0048852 A1 | 2/2009 | Burns et al. |
| 2009/0055546 A1 | 2/2009 | Jung et al. |
| 2009/0060452 A1 | 3/2009 | Chaudhri |
| 2009/0066839 A1 | 3/2009 | Jung et al. |
| 2009/0132599 A1 | 5/2009 | Soroushian et al. |
| 2009/0132721 A1 | 5/2009 | Soroushian et al. |
| 2009/0132824 A1 | 5/2009 | Terada et al. |
| 2009/0136216 A1 | 5/2009 | Soroushian et al. |
| 2009/0150557 A1 | 6/2009 | Wormley et al. |
| 2009/0169181 A1 | 7/2009 | Priyadarshi et al. |
| 2009/0201988 A1 | 8/2009 | Gazier et al. |
| 2009/0226148 A1 | 9/2009 | Nesvadba et al. |
| 2009/0292819 A1 | 11/2009 | Kandekar et al. |
| 2009/0293116 A1 | 11/2009 | DeMello |
| 2009/0303241 A1 | 12/2009 | Priyadarshi et al. |
| 2009/0307258 A1 | 12/2009 | Priyadarshi et al. |
| 2009/0307267 A1 | 12/2009 | Chen et al. |
| 2009/0313544 A1 | 12/2009 | Wood et al. |
| 2009/0313564 A1 | 12/2009 | Rottler et al. |
| 2009/0316783 A1 | 12/2009 | Au et al. |
| 2009/0317064 A1 | 12/2009 | Matsubayashi |
| 2009/0328124 A1 | 12/2009 | Khouzam et al. |
| 2010/0037139 A1 | 2/2010 | Loebig et al. |
| 2010/0040351 A1 | 2/2010 | Toma et al. |
| 2010/0057928 A1 | 3/2010 | Kapoor et al. |
| 2010/0066918 A1* | 3/2010 | Gupta ............ H04H 20/426 348/734 |
| 2010/0074324 A1 | 3/2010 | Qian et al. |
| 2010/0083322 A1 | 4/2010 | Rouse |
| 2010/0095121 A1 | 4/2010 | Shetty et al. |
| 2010/0111192 A1 | 5/2010 | Graves |
| 2010/0118206 A1 | 5/2010 | Gao et al. |
| 2010/0158109 A1 | 6/2010 | Dahlby et al. |
| 2010/0161825 A1 | 6/2010 | Ronca et al. |
| 2010/0186092 A1 | 7/2010 | Takechi et al. |
| 2010/0189183 A1 | 7/2010 | Gu et al. |
| 2010/0228795 A1 | 9/2010 | Hahn |
| 2010/0235472 A1 | 9/2010 | Sood et al. |
| 2010/0290761 A1 | 11/2010 | Drake et al. |
| 2010/0313225 A1 | 12/2010 | Cholas et al. |
| 2010/0313226 A1 | 12/2010 | Cholas et al. |
| 2010/0319014 A1 | 12/2010 | Lockett et al. |
| 2010/0325193 A1 | 12/2010 | Baldwin |
| 2011/0035507 A1 | 2/2011 | Brueck et al. |
| 2011/0047209 A1 | 2/2011 | Lindholm et al. |
| 2011/0066673 A1 | 3/2011 | Outlaw |
| 2011/0080940 A1 | 4/2011 | Bocharov |
| 2011/0082924 A1 | 4/2011 | Gopalakrishnan |
| 2011/0083073 A1 | 4/2011 | Atkins et al. |
| 2011/0107220 A1 | 5/2011 | Perlman |
| 2011/0107379 A1 | 5/2011 | Lajoie et al. |
| 2011/0126191 A1 | 5/2011 | Hughes et al. |
| 2011/0142415 A1 | 6/2011 | Rhyu |
| 2011/0145726 A1 | 6/2011 | Wei et al. |
| 2011/0149753 A1 | 6/2011 | Bapst et al. |
| 2011/0150100 A1 | 6/2011 | Abadir |
| 2011/0153785 A1 | 6/2011 | Minborg et al. |
| 2011/0173345 A1 | 7/2011 | Knox et al. |
| 2011/0191803 A1 | 8/2011 | Baldwin et al. |
| 2011/0197237 A1 | 8/2011 | Turner |
| 2011/0225315 A1 | 9/2011 | Wexler et al. |
| 2011/0225417 A1 | 9/2011 | Maharajh et al. |
| 2011/0238789 A1 | 9/2011 | Luby et al. |
| 2011/0239078 A1 | 9/2011 | Luby et al. |
| 2011/0246657 A1 | 10/2011 | Glow |
| 2011/0246659 A1 | 10/2011 | Bouazizi |
| 2011/0252118 A1 | 10/2011 | Pantos et al. |
| 2011/0264530 A1 | 10/2011 | Santangelo et al. |
| 2011/0268178 A1 | 11/2011 | Park et al. |
| 2011/0289529 A1 | 11/2011 | Jordan et al. |
| 2011/0289534 A1 | 11/2011 | Jordan et al. |
| 2011/0302319 A1 | 12/2011 | Ha et al. |
| 2011/0305273 A1 | 12/2011 | He et al. |
| 2011/0307781 A1 | 12/2011 | Sood et al. |
| 2011/0314176 A1 | 12/2011 | Frojdh et al. |
| 2012/0011225 A1 | 1/2012 | Keum et al. |
| 2012/0023251 A1 | 1/2012 | Pyle et al. |
| 2012/0030723 A1 | 2/2012 | Baum |
| 2012/0042091 A1 | 2/2012 | McCarthy |
| 2012/0079528 A1 | 3/2012 | Trimper et al. |
| 2012/0093214 A1 | 4/2012 | Urbach |
| 2012/0096355 A1 | 4/2012 | Vallone et al. |
| 2012/0117201 A1 | 5/2012 | Arolovitch |
| 2012/0131627 A1 | 5/2012 | Chittella |
| 2012/0141096 A1 | 6/2012 | Ellis et al. |
| 2012/0143986 A1 | 6/2012 | Robinson |
| 2012/0170642 A1 | 7/2012 | Braness et al. |
| 2012/0170643 A1 | 7/2012 | Soroushian et al. |
| 2012/0170906 A1 | 7/2012 | Soroushian et al. |
| 2012/0170915 A1 | 7/2012 | Braness et al. |
| 2012/0173751 A1 | 7/2012 | Braness et al. |
| 2012/0177101 A1 | 7/2012 | van der Schaar |
| 2012/0179834 A1 | 7/2012 | van der Schaar et al. |
| 2012/0192234 A1 | 7/2012 | Britt et al. |
| 2012/0233345 A1 | 9/2012 | Hannuksela |
| 2012/0254455 A1 | 10/2012 | Adimatyam et al. |
| 2012/0254457 A1 | 10/2012 | Condon et al. |
| 2012/0254917 A1 | 10/2012 | Burkitt et al. |
| 2012/0278449 A1 | 11/2012 | Wu et al. |
| 2012/0278496 A1 | 11/2012 | Hsu |
| 2012/0294355 A1 | 11/2012 | Holcomb et al. |
| 2012/0307883 A1 | 12/2012 | Graves |
| 2012/0311094 A1 | 12/2012 | Biderman et al. |
| 2012/0314778 A1 | 12/2012 | Salustri et al. |
| 2013/0007200 A1 | 1/2013 | van der Schaar et al. |
| 2013/0042015 A1 | 2/2013 | Begen et al. |
| 2013/0044821 A1 | 2/2013 | Braness et al. |
| 2013/0046849 A1 | 2/2013 | Wolf |
| 2013/0046902 A1 | 2/2013 | Villegas Nuñez et al. |
| 2013/0051554 A1 | 2/2013 | Braness et al. |
| 2013/0054958 A1 | 2/2013 | Braness et al. |
| 2013/0058480 A1 | 3/2013 | Ziskind et al. |
| 2013/0061040 A1 | 3/2013 | Kiefer et al. |
| 2013/0061045 A1 | 3/2013 | Kiefer et al. |
| 2013/0089142 A1 | 4/2013 | Begen et al. |
| 2013/0124749 A1 | 5/2013 | Thang et al. |
| 2013/0159388 A1 | 6/2013 | Forsman et al. |
| 2013/0166765 A1 | 6/2013 | Kaufman |
| 2013/0166906 A1 | 6/2013 | Swaminathan et al. |
| 2013/0170561 A1 | 7/2013 | Hannuksela |
| 2013/0226578 A1 | 8/2013 | Bolton et al. |
| 2013/0311670 A1 | 11/2013 | Tarbox et al. |
| 2013/0329781 A1 | 12/2013 | Su et al. |
| 2014/0003516 A1 | 1/2014 | Soroushian |
| 2014/0006951 A1* | 1/2014 | Hunter ............ H04H 60/31 715/719 |
| 2014/0101722 A1 | 4/2014 | Moore |
| 2014/0189065 A1 | 7/2014 | van der Schaar et al. |
| 2014/0241420 A1 | 8/2014 | Orton-jay et al. |
| 2014/0241421 A1 | 8/2014 | Orton-jay et al. |
| 2014/0250473 A1 | 9/2014 | Braness et al. |
| 2014/0359669 A1 | 12/2014 | Lemus et al. |

FOREIGN PATENT DOCUMENTS

| | | |
|---|---|---|
| WO | 2004102571 A1 | 11/2004 |
| WO | 2009065137 A1 | 5/2009 |
| WO | 2010060106 A1 | 5/2010 |
| WO | 2010122447 A1 | 10/2010 |
| WO | 2011103364 A1 | 8/2011 |
| WO | 2011112003 A2 | 9/2011 |
| WO | 2012094171 A1 | 7/2012 |
| WO | 2012094181 A2 | 7/2012 |
| WO | 2012094189 A1 | 7/2012 |

OTHER PUBLICATIONS

European Search Report for Application 11855103.5, search completed Jun. 26, 2014, 9 pgs.

European Search Report for Application 11855237.1, search completed Jun. 12, 2014, 9 pgs.

European Search Report for European Application No. 13819779.3, Search completed May 10, 2016, dated May 17, 2016, 12 Pgs.

(56) References Cited

OTHER PUBLICATIONS

Federal Computer Week, "Tool Speeds Info to Vehicles", Jul. 25, 1999, 5 pages.
HTTP Live Streaming Overview, Networking & Internet, Apple, Inc., Apr. 1, 2011, 38 pages.
InformationWeek, "Internet on Wheels", InformationWeek: Front End: Daily Dose, Jul. 20, 1999, Printed on Mar. 26, 2014, 3 pgs.
International Preliminary Report on Patentability for International Application PCT/US2013/043181, issued Dec. 31, 2014, dated Jan. 8, 2015, 11 Pgs.
International Preliminary Report on Patentability for International Application PCT/US2013/051024, Report issued Jul. 7, 2014, dated Jul. 18, 2014, 26 Pgs.
International Search Report and Written Opinion for International Application No. PCT/US2013/051024, Completed Oct. 2, 2013, dated Oct. 8, 2013, 12 pgs.
International Search Report and Written Opinion for International Application No. PCT/US2013/043181, completed Nov. 27, 2013, dated Dec. 6, 2013, 12 pgs.
International Search Report and Written Opinion for International Application PCT/US2011/066927, completed Apr. 3, 2012, dated Apr. 20, 2012, 14 pgs.
International Search Report and Written Opinion for International Application PCT/US2011/067167, completed Jun. 19, 2012, dated Jul. 2, 2012, 11 pgs.
International Standard, Information technology—Coding of audio-visual objects—Part 12: ISO base media file format, ISO/IEC 14496-12:2012(E), Jul. 15, 2012, 194 pgs. (presented in three parts).
International Standard, Information technology—Dynamic adaptive streaming over HTTP (DASH)—Part 1: Media presentation description and segment formats, ISO/IEC 23009-1:2012(E), Apr. 1, 2012, 134 pgs.
International Standard, Information technology—Generic coding of moving pictures and associated audio information: Systems, ISO/IEC 13818-1:2000(E), Dec. 1, 2000 174 pgs. (presented in two parts).
International Standard, Information technology—JPEG 2000 image coding system—Part 12: ISO base media file format, SIO/IEC 15444-12:2012(E), Sep. 15, 2012, 194 pgs. (presented in three parts).
ITS International, "Fleet System Opts for Mobile Server", Aug. 26, 1999, Printed on Oct. 21, 2011 from http://www.itsinternational.com/News/article.cfm?recordID=547, 1 pg.
Microsoft Media Platform: Player Framework, "Microsoft Media Platform: Player Framework v2.5 (formerly Silverlight Media Framework)", May 3, 2011, 2 pages.
Microsoft Media Platform: Player Framework, "Silverlight Media Framework v1.1", Jan. 2010, 2 pages.
Microsoft, "Smooth Streaming", 2013, Retrieved from: http://www.iis.net/download/smoothstreaming, 2pgs.
Wikipedia, "Zap time", Feb. 28, 2012, Retrieved Jul. 7, 2012, http://en.wikipedia.org/wiki/Zap_time, 4 pgs.
William May, Jr., "HTTP Live Streaming", Mar. 23, 2012, Retrieved from: http://tools.ietf.org/html/draft-pantos-http-live-streaming-08, 66 pgs.
"Adaptive Streaming Comparison", Jan. 28, 2010, 5 pgs.
"Best Practices for Multi-Device Transcoding", Kaltura Open Source Video, 2013, Printed on Nov. 27, 2013 from knowledge.kaltura.com/best-practices-multi-device-transcoding, 13 pgs.
"Netflix turns on subtitles for PC, MAC streaming", Yahoo! News, Apr. 21, 2010, Printed on Mar. 26, 2014, 3 pgs.
"Smooth Streaming Client", The Official Microsoft IIS Site, Sep. 24, 2010, 4 pages.
"Supported Media Formats", Supported Media Formats, Android Developers, Printed on Nov. 27, 2013 from developer.android.com/guide/appendix/media-formats.html, 3 pgs.
"Thread: SSME (Smooth Streaming Medial Element) config.xml review (Smooth Streaming Client configuration file)", The Official Microsoft IIS Site, Aug. 10, 2011, Printed on Mar. 26, 2014, 3 pgs.

"Transcoding Best Practices", From movideo, Printed on Nov. 27, 2013 from code.movideo.com/Transcoding_Best_Practices, 5 pgs.
"Using HTTP Live Streaming", iOS Developer Library, http://developer.apple.com/library/ios/#documentation/networkinginternet/conceptual/streamingmediaguide/UsingHTTPLiveStreaming/UsingHTTPLiveStreaming.html#//apple_ref/doc/uid/TP40008332-CH102-SW1, Feb. 11, 2014, 10 pgs.
U.S. Appl. No. 13/224,298, "Final Office Action Received", dated May 19, 2014, 26 pgs.
Akhshabi et al., "An Experimental Evaluation of Rate-Adaptation Algorithms in Adaptive Streaming over HTTP", MMSys'11, Feb. 23-25, 2011, 12 pgs.
Anonymous, "Method for the encoding of a compressed video sequence derived from the same video sequence compressed at a different bit rate without loss of data", ip.com, ip.com No. IPCOM000008165D, May 22, 2002, pp. 1-9.
Author Unknown, "Tunneling QuickTime RTSP and RTP over HTTP", Published by Apple Computer, Inc., 1999, 6 pages.
Deutscher, "IIS Transform Manager Beta—Using the MP4 to Smooth Task", Apr. 29, 2011, Retrieved from: https://web.archive.org/web/20130328111303/http://blog.johndeutscher.com/category/smooth-streaming, 14 pgs.
Fuchs et al., "Optimizing channel change time in IPTV applications", Broadband Multimedia Systems and Broadcasting, 2008 IEEE International Symposium on IEEE, Piscataway, NJ, USA, Mar. 31, 2008, pp. 1-8, XP031268571, ISBN: 978-1-4244-1648-6.
Gannes, "The Lowdown on Apple's HTTP Adaptive Bitrate Streaming", GigaOM, Jun. 10, 2009, 12 pgs.
Ghosh, "Enhancing Silverlight Video Experiences with Contextual Data", 2010, Retrieved from: http://msdn.microsoft.com/en-us/magazine/ee336025.aspx, 15 pgs.
Inlet Technologies, "Adaptive Delivery to iDevices", 2010, 2 pages.
Inlet Technologies, "Adaptive delivery to iPhone 3.0", 2009, 2 pgs.
Inlet Technologies, "HTTP versus RTMP", 2009, 3 pages.
Inlet Technologies, "The World's First Live Smooth Streaming Event: The French Open", 2009, 2 pages.
Kim, Kyuheon, "MPEG-2 ES/PES/TS/PSI", Kyung-Hee University, Oct. 4, 2010, 66 pages.
Kurzke et al., "Get Your Content Onto Google TV", Google, Retrieved from: http://commondatastorage.googleapis.com/io2012/presentations/live%20to%20website/1300.pdf, 2012, 58 pgs.
Lang, "Expression Encoder, Best Practices for live smooth streaming broadcasting", Microsoft Corporation, 2010, retrieved from http://www.streamingmedia.com/conferences/west2010/presentations/SMWest-12010-Expression-Encoder.pdf, 20 pgs.
Levkov, "Mobile Encoding Guidelines for Android Powered Devices", Adobe Systems Inc., Addendum B, Dec. 22, 2010, 42 pgs.
MSDN, "Adaptive streaming, Expression Studio 2.0", Apr. 23, 2009, 2 pgs.
Nelson, "Smooth Streaming Deployment Guide", Microsoft Expression Encoder, Aug. 2010, 66 pgs.
Noe, A., "Matroska File Format (under construction!)", Retrieved from the Internet: URL:http://web.archive.org web/20070821155146/www.matroska.org/technical/specs/matroska.pdf [retrieved on Jan. 19, 2011], Jun. 24, 2007, pp. 1-51.
Ozer, "The 2012 Encoding and Transcoding Buyers' Guide", Streamingmedia.com, Retrieved from: http://www.streamingmedia.com/Articles/Editorial/Featured-Articles/The-2012-Encoding-and-Transcoding-Buyers-Guide-84210.aspx, 2012, 8 pgs.
Pantos, "HTTP Live Streaming, draft-pantos-http-live-streaming-10", IETF Tools, Oct. 15, 2012, Retrieved from: http://tools.ietf.org/html/draft-pantos-http-live-streaming-10, 37 pgs.
Pantos, R, "HTTP Live Streaming: draft-pantos-http-live-streaming-06", Published by the Internet Engineering Task Force (IETF), Mar. 31, 2011, 24 pages.
RGB Networks, "Comparing Adaptive HTTP Streaming Technologies", Nov. 2011, Retrieved from: http://btreport.net/wp-content/uploads/2012/02/RGB-Adaptive-HTTP-Streaming-Comparison-1211-01.pdf, 20 pgs.
Schulzrinne et al., "Real Time Streaming Protocol 2.0 (RTSP): draft-ietfmmusic-rfc2326bis-27", MMUSIC Working Group of the Internet Engineering Task Force (IETF), Mar. 9, 2011, 296 pages.

(56) References Cited

OTHER PUBLICATIONS

Siglin, "HTTP Streaming: What You Need to Know", streamingmedia.com, 2010, 15 pages.
Siglin, "Unifying Global Video Strategies, MP4 File Fragmentation for Broadcast, Mobile and Web Delivery", Nov. 16, 2011, 16 pgs.
Wu, Feng et al., "Next Generation Mobile Multimedia Communications: Media Codec and Media Transport Perspectives", In China Communications, Oct. 2006, pp. 30-44.
Zambelli, Alex, "IIS Smooth Streaming Technical Overview", Microsoft Corporation, Mar. 2009, 17 pages.

* cited by examiner

SYSTEMS AND METHODS FOR RAPID CONTENT SWITCHING TO PROVIDE A LINEAR TV EXPERIENCE USING STREAMING CONTENT DISTRIBUTION

CROSS-REFERENCE TO RELATED APPLICATIONS

The present application claims priority under 35 U.S.C. 120 as a continuation of U.S. patent application Ser. No. 13/945,871, entitled "Systems and Methods for Rapid Content Switching to Provide a Linear TV Experience Using Streaming Content Distribution" to Thorwirth et al., filed Jul. 18, 2013, which claims priority under 35 U.S.C. 119(e) to U.S. Provisional Application No. 61/673,177, entitled "Enabling a Linear TV Experience with Unicast Content Distribution Systems" to Thorwirth et al., filed Jul. 18, 2012, the disclosure of which are incorporated herein by reference in their entirety.

FIELD OF THE INVENTION

The present invention generally relates to playback of streaming content and specifically to rapid content switching between different content available for streaming.

BACKGROUND OF THE INVENTION

Digital consumption of audio and video content has proliferated in recent years. The main drivers include ubiquitous Internet connected devices and a variety of content offerings available from services like Netflix, Amazon and Pandora. Video content includes media such as TV shows, motion pictures, news casts, and user generated content clips. Audio content includes media such as music, news casts, and audio books. Content can also include image data such as digital images. Some methods of content delivery can be termed Over The Top (OTT) where the distribution network is not owned by the content distributor (for example, internet distribution of Netflix content). OTT networks are often characterized by uncertain, variable network conditions.

Technologies such as adaptive bitrate streaming can help overcome variations in network properties, such as those posed by OTT networks, and enable uninterrupted playback of content in a way that can compete with consumption of content on tangible media, such as DVD and CD, and with linear programming, such as cable, terrestrial, and satellite TV. Adaptive bitrate streaming, or adaptive streaming, involves detecting the present streaming conditions (e.g., the user's network bandwidth and CPU capacity) during playback and adjusting the quality of the streamed media accordingly. Typically, the source media is encoded at multiple bit rates and the playback device (or client) switches between requesting different encodings depending on available resources and streaming conditions. When a playback device commences adaptive bitrate streaming, the playback device typically starts by requesting portions of media from the lowest bitrate streams (where different bitrate streams are available). As the playback device downloads the requested media, the playback device can measure the available bandwidth and local processing resources. In the event that there is additional bandwidth and processing resources available, the playback device can switch to higher bitrate streams. Current protocols for adaptive bitrate streaming include HTTP Live Streaming (HLS) developed by Apple Inc. of Cupertino, Calif., Microsoft Smooth Streaming IIS Media Services extension (MSS) developed by Microsoft Corporation of Redmond, Wash., HTTP Dynamic Streaming (HDS) developed by Adobe Systems Incorporated of San Jose, Calif., and Dynamic Adaptive Streaming over HTTP (DASH) specified by the Moving Picture Experts Group (MPEG).

The consumption of media on demand enables consumer choice and can free the consumption habits of users from linear content that is broadcasted at set times, such as by terrestrial, satellite, and cable TV. Despite the availability of DVRs (Digital Video Recorders) and VOD (Video On Demand) libraries, which enable the consumption of content at times convenient to a user, the actual consumption habits often still favor linear TV as several recent studies have shown.

The selection from a catalog or menu of recorded content initially appears to be the most obvious choice to enable content selection, and DVR (Digital Video Recorder) menus, VOD libraries, and services like Netflix typically currently provide a user interface that allows for this selection. When browsing for alternative content options the user interface typically requires leaving the playback environment, selecting a different piece of content, loading it, buffering until it is ready to start playback and playing the opening credits until the user can get a first impression of the content. When the user is looking for a suggestion of alternative content that can be quickly evaluated by the user, changing channels (surfing) using linear TV is typically a quick and simple experience where pressing a channel up or down button results in near-instant switching to display content from the next channel that can be evaluated by the user as a consumption option.

SUMMARY OF THE INVENTION

Systems and methods for rapid content switching between pieces of content presented in a plurality of stations using streaming content distribution (e.g. unicast streaming) in accordance with embodiments of the invention are disclosed. In one embodiment, a process includes processing at least a portion of a station manifest using a playback device, where the station manifest includes identifiers for a plurality of content stations and identifiers for a plurality of pieces of content, where each piece of content is associated with at least one content station, selecting a plurality of jump points using the playback device, where each jump point is associated with a specific location within a piece of content, determining a current content station from the plurality of content stations using the playback device, playing at least a portion of a current piece of content associated with the current content station from the plurality of pieces of content using the playback device, determining a plurality of alternative pieces of content from the plurality of pieces of content using the station manifest using the playback device, preparing additional content for playback at each of the plurality of jump points by preparing alternative pieces of content during playback of the current piece of content using the playback device, receiving a user instruction during playback of the current piece of content using the playback device, selecting a target jump point from the plurality of jump points based upon the received user instruction using the playback device, and commencing playback of prepared additional content starting from the selected target jump point using the playback device.

In a further embodiment, the selected target jump point is associated with a specific location within an alternative piece of content.

In another embodiment, the selected target jump point is associated with a specific location within the current piece of content.

In a still further embodiment, preparing additional content for playback includes buffering at least a portion of each of the plurality of alternative pieces of content using the playback device.

In still another embodiment, buffering at least a portion of at least some of the plurality of alternative pieces of content using the playback device includes buffering alternative content starting from a jump point in each alternative piece of content.

In a yet further embodiment, the process also includes determining the likelihood that certain jump points will be selected by a user instruction and buffering alternative content starting from a jump point in each alternative piece of content also includes buffering a stream of the alternative piece of content whose bitrate is related to the likelihood a jump point in the alternative piece of content will be selected.

In yet another embodiment, the number of jump points at which alternative content is buffered and the bitrate of the alternative content that is buffered are related to the current available bandwidth.

In a further embodiment again, preparing additional content for playback also includes preparing the current piece of content.

In another embodiment again, preparing additional content for playback includes downloading at least one content manifest associated with an alternative piece of content.

In another additional embodiment, preparing additional content for playback includes downloading metadata associated with an alternative piece of content.

In a still yet further embodiment, preparing additional content for playback includes pre-fetching cryptographic information that can be used to decrypt alternative pieces of content.

In still yet another embodiment, the current piece of content is determined based upon the current content station and a current time, and determining a plurality of alternative pieces of content using the playback device also includes determining a plurality of alternative pieces of content based upon the current content station and the current time.

A still further embodiment again also includes generating a user interface listing at least some of the plurality of content stations and at least one piece of content associated with each listed content station using the playback device, and In still another embodiment again, receiving a user instruction using the playback device includes receiving a user instruction via the interactive user interface that identifies a listed piece of content.

In a still further additional embodiment, the identifiers for a plurality of pieces of content are references to content manifests, where a reference to a content manifest is associated with each piece of content.

In still another additional embodiment, the station manifest also includes a plurality of references to content manifests, where a reference to a content manifest is associated with each piece of content.

In a yet further embodiment again, the station manifest also includes a plurality of jump points, where each jump point is associated with a specific location within a piece of content.

Yet another embodiment again also includes requesting a station manifest from a station manifest server using the playback device.

In a yet further additional embodiment, the station manifest is generated based a user profile.

In yet another additional embodiment, the station manifest is generated based on the current time.

A further additional embodiment again also includes updating the plurality of jump points periodically.

In another additional embodiment again, playing a current piece of content associated with the current content station from the plurality of pieces of content using the playback device also includes requesting content using adaptive bitrate streaming.

In a still yet further embodiment again, the content manifests are in at least two different formats and come from at least two different content sources.

In still yet another embodiment again, the user instruction is for a station change and the selected target jump point is within an alternative piece of content.

In a still yet further additional embodiment, the user instruction is for playback from a different point within the current piece of content and the selected target jump point is within the current piece of content.

In still yet another additional embodiment, a playback device for rapid content switching between pieces of content presented in a plurality of stations using streaming content distribution includes a processor, a network interface, and memory including a playback application, where the processor is configured by the playback application to process at least a portion of a station manifest using a playback device, where the station manifest includes identifiers for a plurality of content stations and identifiers for a plurality of pieces of content, where each piece of content is associated with at least one content station, select a plurality of jump points, where each jump point is associated with a specific location within a piece of content, determine a current content station from the plurality of content stations using the playback device, play at least a portion of a current piece of content associated with the current content station from the plurality of pieces of content using the playback device, determine a plurality of alternative pieces of content from the plurality of pieces of content using the station manifest using the playback device, prepare additional content for playback at each of the plurality of jump points by preparing alternative pieces of content during playback of the current piece of content using the playback device, receive a user instruction during playback of the current piece of content using the playback device, select a target jump point from the plurality of jump points based upon the received user instruction using the playback device, and commence playback of prepared additional content starting from the selected target jump point using the playback device.

DETAILED DISCLOSURE OF THE INVENTION

Figure 1:
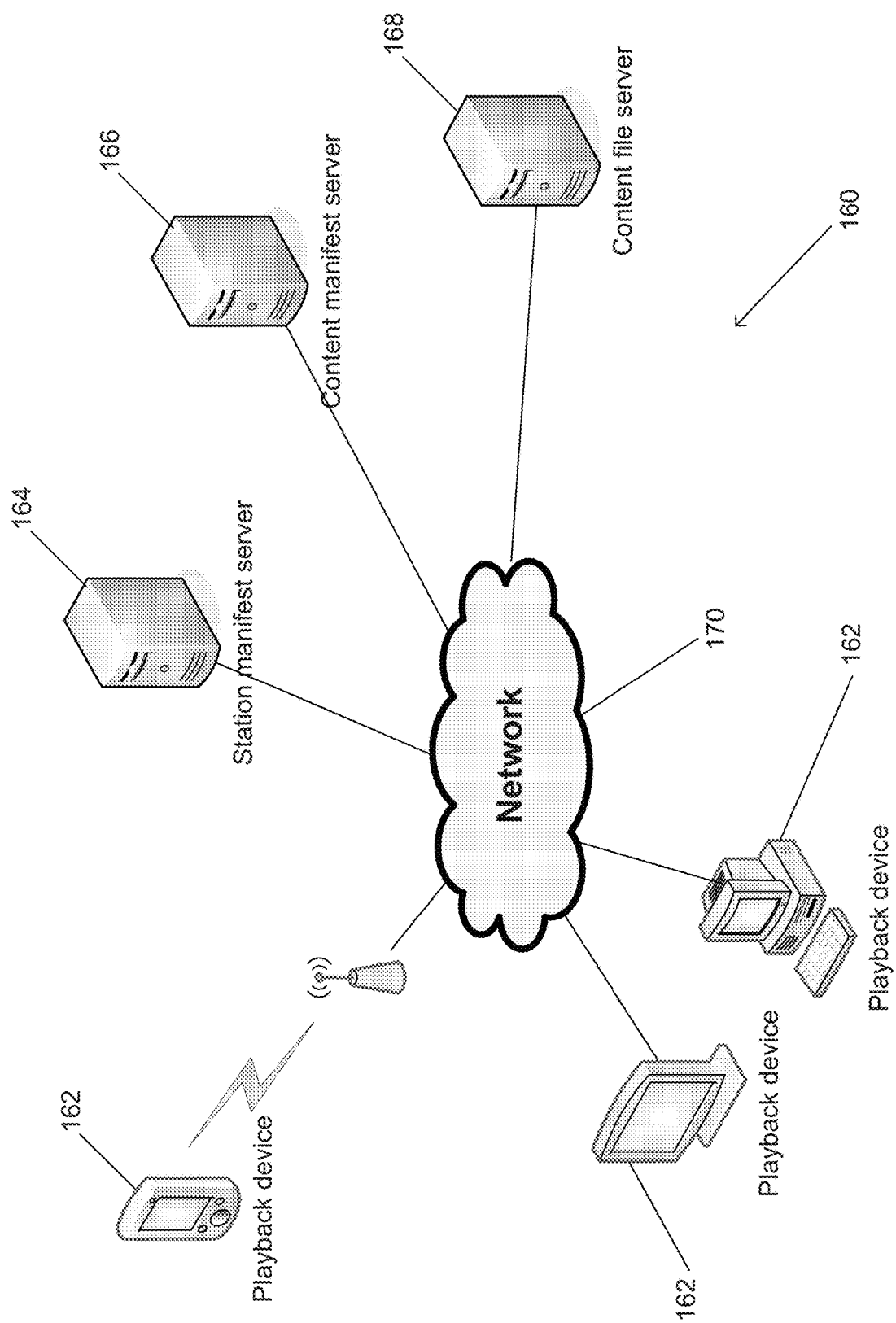
FIG. 1 illustrates a system for content playback that includes rapid content switching in accordance with embodiments of the invention.

Turning now to the drawings, systems and methods for rapid content switching to provide a linear TV experience using streaming content distribution in accordance with embodiments of the invention are disclosed. As discussed further above, changing channels (or surfing) with a linear TV source (such as broadcast, satellite, or cable TV) is typically a quick and simple experience that is not replicated in many streaming or OTT-based services. In many embodiments of the invention, servers, content and playback devices in a unicast content streaming system, such as those delivering Video on Demand (VOD) content, are configured to provide a rapid content switching experience similar to channel surfing on linear TV (e.g. multicast content systems).

In different embodiments of the invention, various technologies can be utilized for content delivery. Many embodiments of the invention can utilize adaptive bitrate technologies as a transport mechanism to deliver content. In other embodiments, video streaming techniques may be utilized that assume a fixed/guaranteed bandwidth and/or apply other techniques to assure QoS (Quality of Service). In several embodiments, content is delivered over an Over the Top (OTT) network, while in other embodiments the networks have other types of ownership structures and/or are characterized by different variances in network conditions. Video content can typically be segmented into "chunks" as a unit for referencing portions of the content and transferring the content. For example, in adaptive bitrate streaming, alternative chunks of the same visual content portion can be stored as chunks in different quality representations with different data sizes. The chunks are typically formatted to allow switching between different bitrates. Typically a few seconds in length (but not always limited as such), they can be seamlessly played after preceding chunks of the same content even if the bitrate used to compress the two chunks is different. A playback device can adapt to the highest possible quality that plays back without interruption or degradation given the available resources. Chunks may be actual file fragments, indexed locations of a larger file, or may be prepared just in time during the request of a chunk. Chunks may be applied to the ISO file format, an MPEG transport stream or other container formats that contain media compressed in different codecs such as MPEG-2, AVC/H.264 or HEVC. In various video standards, chunks may also be called segments or fragments. In further embodiments, static web pages are prepared as video content for similar delivery as streaming video.

The channel surfing experience can be enabled by providing a user with a list of stations (i.e. channels) with associated content and allowing a user to switch between the stations. In many embodiments of the invention, a station (or channel) can be understood as a collection of content that is ordered with a playback sequence. Similar to broadcast TV, where a station is typically broadcasted as a single TV channel with a dedicated transmission frequency (e.g., Fox News), in many embodiments of the invention, digital content over an OTT network that is delivered to an individual user can be presented to the user in a way similar to a TV channel and can be changed similar to channel surfing between broadcast TV stations. In different embodiments of the invention, the set of stations available to a user may be common to all users or may be targeted to individual users, e.g., by being defined by a user or her determined preferences. In several embodiments, a playback device obtains a station manifest describing stations and their associated content. A user can select from content in different ways such as, but not limited to, using an interactive interface displaying information from the station manifest similar to a linear TV content guide or using controls to switch to the next or previous channel. In additional embodiments, a station manifest includes locations within the content (i.e., "jump points" as will be discussed further below) from which playback can start following a user selection.

A further feature of the channel surfing experience is the ability to change between stations with minimal time delay. In several embodiments, content is pre-buffered and playback is prepared for stations other than the station that is currently being played back so that when a user switches to that station, playback can begin immediately. As discussed above, content is prepared in chunks for the purpose of enabling dynamic bitrate adjustments in many adaptive bitrate streaming systems. In many embodiments of the invention, chunks are downloaded not only from content in the current station, but also from content in neighboring stations (i.e., stations adjacent to the current station in the station line-up or ordering of stations). Several adjacent channels are buffered such that after repeated channel changes requested by a user, content in the selected channel is available for immediate playback. Buffering for playback is not limited only to media data, but playback of alternative content can also be prepared by pre-fetching other information such as, but not limited to, metadata used to present the station, content manifests, and digital rights management (DRM) licenses and cryptographic information (e.g. decryption keys). This can allow for an immediate switching between pieces of content that is faster than many current linear TV channel change times of between 2 to 4.8 seconds. Compared to linear TV, the decoder in the playback device need not wait for another I frame in an adjacent station because the content is already pre-buffered and can resume more rapidly, e.g., from the beginning of a chunk that starts with an I frame. Compared to starting a new alternative bitrate streaming session, all steps to enable immediate playback have been executed and relevant data has been downloaded. These prepared transitions between pieces of content or to different points within one piece of content, referred to here as "rapid switching," can be distinguished from the adaptive switching between versions of the same content encoded at different bitrates that is the core concept of adaptive bitrate streaming systems.

In several embodiments of the invention, pieces of alternative content in other stations are not buffered continuously but are buffered at previously identified jump points. Similar to location markers or bookmarks, jump points can be used to identify locations in programming that are suitable for commencing playback when transitioning from one piece of content to another piece of content (e.g., user selects changing stations) or from one point within a piece of the content to another point (e.g., user selects to play from the beginning or from a scene). A current set of jump points can be updated periodically and can provide a similar user experience of changing content to buffering content continuously.

Systems and methods for rapid content switching in accordance with embodiments of the invention are discussed below.

System Architecture

A system for content playback that includes rapid content switching in accordance with embodiments of the invention is illustrated in FIG. 1. The system 160 includes a number of different types of playback devices 162 that can be any device capable of decoding and playing back content. Content may be encoded as sequences of encoded video frames and separate streams of audio. Content may be encoded in any of a variety of video encoding formats. When adaptive bitrate streaming is used, content may be encoded in different resolutions and/or bitrates. Playback devices can include consumer electronics devices such as TVs, PCs (personal computers), cell phones, MP3 players, DVD players, Blu-ray players, set top boxes, video game consoles, PDAs (personal digital assistants), and tablet PCs. The playback devices 162 can communicate with a station manifest server 164, content manifest server 166, and/or a content file server 168 over a network 170.

A content playback device 162 may retrieve a station manifest from the station manifest server 164. As will be discussed in greater detail further below, a station manifest can include information concerning various pieces of content that can be played back by content playback devices 162, content stations with which specific pieces of content are associated, and jump points that are associated with specific playback locations within pieces of content. A content playback device 162 may retrieve a content manifest from a content manifest server 166. As is discussed further below, a content manifest can include information concerning the location and properties of various content files that contain alternative streams of the same content encoded at different bitrates. A content playback device 162 can retrieve and buffer portions of a content file associated with a piece of content from a content file server 168.

Although specific system architectures for rapid content switching are discussed above with respect to FIG. 1, system architectures can be used to implement rapid content switching in any configuration as appropriate to the requirements of a specific application in accordance with embodiments of the invention. In several embodiments, a single server can provide the features associated with a station manifest server, content manifest server, and/or a content file server. In some embodiments, content is transferred from servers to playback devices over streaming content distribution networks such as OTT networks. Playback devices in accordance with embodiments of the invention are described below.

Playback Devices

Figure 2:
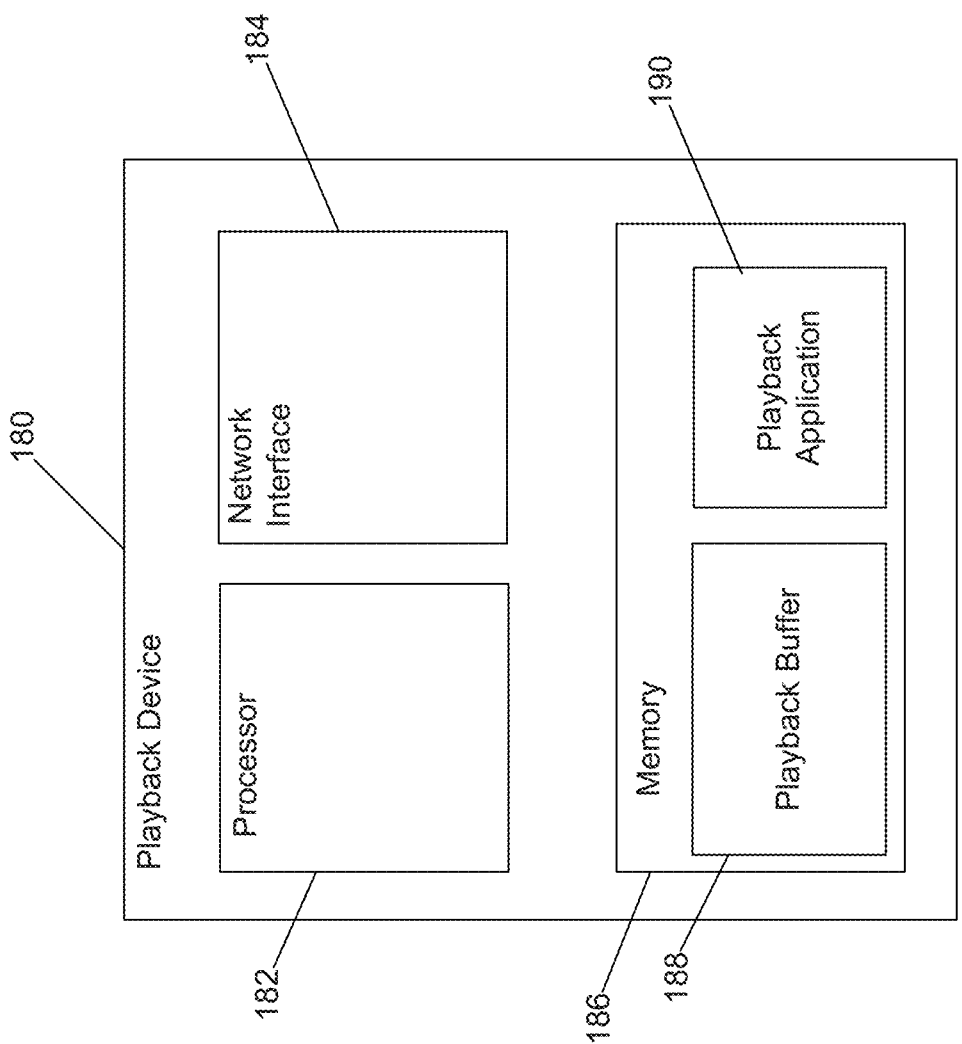
FIG. 2 conceptually illustrates a playback device for playing content and rapid content switching in accordance with embodiments of the invention.

In many embodiments of the invention, a playback device communicates with one or more servers to request content for playback and perform rapid content switching pursuant to user instructions. A playback device for playing content and rapid content switching in accordance with embodiments of the invention is illustrated in FIG. 2. The playback device 180 includes a processor 182, network interface 184, and memory 186. The memory includes a playback buffer 188 and a playback application 190. The buffer 188 typically holds portions of content for playback in the near future. In streaming content distribution systems, such as adaptive bitrate streaming, buffers typically help to overcome variability in network transmission and are used to store portions of content that the device will likely play back soon. In several embodiments, the playback application 190 configures the processor 182 to perform processes for rapid content switching such as those discussed further below. Processes for rapid content switching may include requesting a station manifest from a station manifest server using the network interface 184 and storing the station manifest in memory 186. The processor may also be configured to generate an interactive user interface that is displayed to a user.

In several embodiments, the playback device 180 can receive user instructions from a user via a variety of types of input such as, but not limited to, a remote control, a keyboard, a touch screen, an on-screen control panel, or an interactive user interface. As will be discussed further below, user instructions can result in playback jumping to a jump point. Jump points that can be reached with N user instructions are pre buffered. For large N, more pre buffering would be necessary but more repeated user instructions are possible while maintaining rapid content switching.

User instructions can include "next station" (channel up) and "previous station" (channel down) to switch between stations similar to the "channel surfing" experience described further above. Other user instructions can include "next content" (jumping to the end of the current content and starting to play the next content associated with the station) and "start" (jumping back to the beginning of the current content) within one station. Other playback controls such as pause, fast forward and rewind may also be implemented in accordance with embodiments of the invention.

In many embodiments of the invention, implementation of techniques for rapid content switching can be performed with a local proxy, placing an additional layer that interprets the stations and the switching between them to determine the current relevant bitrate chunks or portions of the current content and feeds those to the existing player capable of adaptive streaming. These components can select a suitable bitrate and play the content as if chunks of a single content file are played and do not require other modifications to support switching between stations.

A playback application can be implemented as a browser plug-in or a stand-alone application. In several embodiments, a station lineup is generated on a server and transmitted to a playback device, and the playback device interprets and executes received user instructions such as station changes. Although a specific architecture for a playback device for rapid content switching is discussed above with respect to FIG. 2, system architectures for playback devices can be used to implement rapid content switching in any configuration as appropriate to the requirements of a specific application in accordance with embodiments of the invention.

Jump Points

Content can commence playback from locations within the content referred to as jump points. In linear TV, programs in different stations progress in time along with the station that is currently watched. As such, a user returns to a scene that is later in time when switching back to a channel. In many embodiments of the invention, jump points can be used to simulate the simultaneous progression in content among different stations that provide streaming playback. For example, a set of jump points associated with content in different stations can be periodically updated to jump points that are further along in their respective pieces of content as time progresses. Similar to the linear TV experience, a user returning to a previously viewed station is presented with a different scene in the content as playback commences from a different jump point. In various embodiments of the invention, a set of jump points can be stored by a playback device or a server (e.g., in a station manifest) that includes one or more jump points associated with one or more pieces of content, where each piece of content is associated with at least one station. In different embodiments, a set of jump points may be downloaded from a server by a playback device or generated by a playback device.

In several embodiments, jump points are determined in regular intervals along a piece of content that can range from a few seconds to several minutes. Smaller intervals keep different stations synchronized and increase the appearance of parallel playback among the stations, as in linear TV. Larger intervals decrease the amount of buffering used to update the jump points.

In different embodiments, jump points may also be set to a predetermined distribution within a piece of content, e.g., one at the very beginning, another 5 minutes in, after the credits are over, one after 15 and 30 minutes, and/or none towards the ending so as not to spoil the plot for the viewer. A jump point for initial content discovery can be about 5 minutes after the start of the content, when the opening credits have passed and the plot provides a good preview.

In many embodiments of the invention, selection of jump points can be implicitly user generated. For example, scenes during which few station changes were requested by users may indicate that those scenes are interesting and jump points can be placed in or at the commencement of those scenes. The system can measure station changes in different ways such as, but not limited to, keeping a count of station change requests by users or calculating the number of users who requested a station change in proportion to the total number of users. Jump points can also be placed in scenes that appear in trailers or have a high amount of action as they may be useful for previewing the piece of content.

Navigation between jump points can be triggered by user interaction and allow to jump to different content pieces or within a content piece.

In several embodiments of the invention, selection of jump points considers the use of resources by the playback device, the server, and/or the content distribution network/system. In some embodiments, jump points can be unified between users (i.e., use the same set of jump points) and/or can be placed in portions of content that can be compressed efficiently or use less data. As the portions of content that contain jump points are played more frequently, placing jump points in portions that are lower in bitrate and/or take up less space/data can result in less data that is transferred, stored, and/or processed by the playback device, the server, and/or the content distribution network. In various embodiments, the update mechanism of jump points can be determined based on available bandwidth. More bandwidth may be available due to fluctuations in the connectivity of devices, the data rate of the currently downloaded/viewed content, and playback of the current station being paused by the user. When more bandwidth is available, jump points can be updated more frequently, more stations can be updated, and the quality of the content being buffered can be dynamically increased (e.g., using adaptive bitrate streaming techniques).

Programming Stations

In many embodiments of the invention, stations group content with similar features, as in existing TV stations that group content by topic or target audience, e.g., Fox News, Discovery Channel, MTV, Biography Channel, History Channel, and Nickelodeon. A station lineup (i.e., listing of stations available for a user to view) in accordance with embodiments of the invention may use the lineup of existing linear TV stations or may be manually edited. In many embodiments, each station has a content lineup that identifies pieces of content associated with the station and scheduled for playback at predetermined times and/or in a predetermined order.

In several embodiments, stations are created individually for each user. In further embodiments, stations are automatically generated from direct or indirect user input. Direct user input or preferences can be provided through a user profile containing characteristics such as, but not limited to, movie ratings, interests, and/or keywords that may specify topics such as a genre, actor, or interest area (e.g., travel, New York City, kite surfing, Denzel Washington, history, news, romantic comedy trailers, cartoons, Bugs Bunny). A content lineup for a station can be generated automatically using the user profile. Stations can be created for individual members of a household and can be protected with a PIN (personal identification number) for parental control or privacy.

In many embodiments, indirect user input is automatically collected for station creation. For example, a user's viewing history can provide indirect user input. Watching a piece of content can be considered interest in similar types of content, while switching to another station can be considered disinterest in the type of content presented by the station. Content that the user has already viewed or rejected can be deem phasized in stations provided to the user. A viewing history can be generated by a variety of sources including external sources.

Data aggregation and evaluation techniques such as collaborative filtering can be used to determine preferences of users from information gathered about other users. For example, the determinations of interest in content discussed above (implicit approval) can be applied to other users that have similar preferences. Preferences can also be collected from people close to the user by explicit input or derived from existing information in social networks.

In addition or in alternative to the above user preferences, content for stations may be assembled based on popularity and/or availability of pieces of content or other content properties such as, but not limited to, ratings from other users, box office results, release date, actors, movie production budget and availability date in content library. In various embodiments, stations may also be assembled based on external data such as time of day, time of year, trending topics in the news or social media, the user's location or user interests derived from other consumption habits of the user on other websites or services.

As will be discussed further below, buffer and resource optimizations can be utilized in assembling content for a station. Any of the techniques discussed herein for creating a station's content lineup can be used individually or in combination to fine tune or adjust the content lineup. Station manifests and content manifests for the playback of content in accordance with embodiments of the invention are discussed below.

Station Manifest and Content Manifest

A station lineup can be embodied in a file known as a station manifest. A station manifest can be viewed as a multi-dimensional playlist that lists stations and a time table or schedule of pieces of content associated with different stations to be played at scheduled times. In many embodiments of the invention, a station manifest includes the available stations, content associated with stations, and jump points defining points of access to content. In further embodiments of the invention, a station manifest can include information such as, but not limited to: time for the start and expiration of the station manifest, name of and information about each station, links to content manifests for each piece of content in each station, type and location for jump points for each piece of content in each station, and/or a link to the following station manifest (e.g., for the next time period). In various embodiments of the invention, a station manifest is downloaded by a playback device as an initial step to acquire information to populate a user interface (e.g., a programming guide) and/or begin playback of content. In other embodiments the station manifest is created locally on the playback device. In a simple case, the staion manifest includes two stations only—each with a single piece of content, enabling rapid content switching between the two pieces of content.

Figure 3:
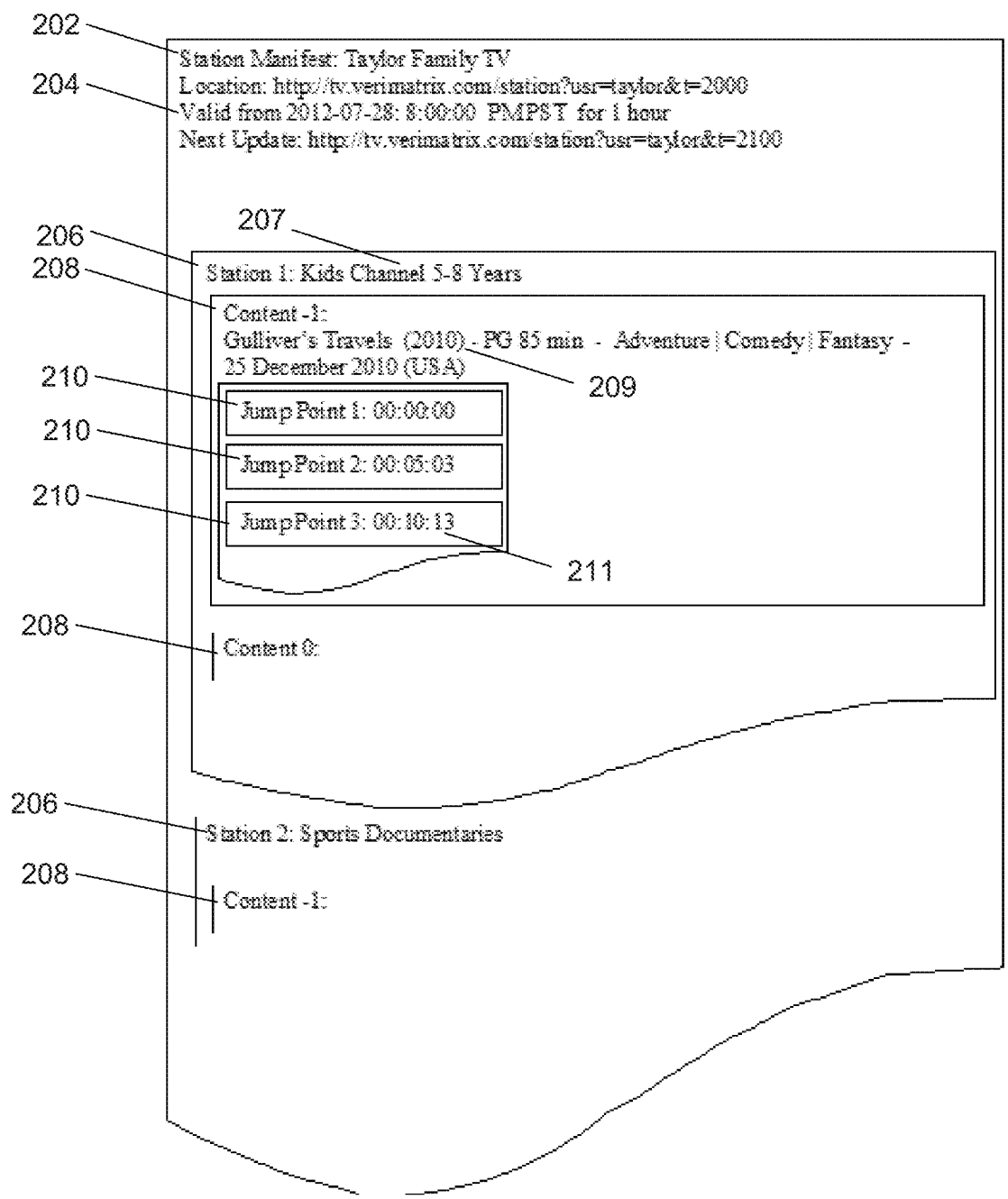
FIG. 3 conceptually illustrates the contents of a station manifest in accordance with embodiments of the invention.

A conceptual illustration of the contents of a station manifest in accordance with embodiments of the invention is illustrated in FIG. 3. The illustration includes a hierarchical structure (although a hierarchical structure is not required) that includes a time 204 for the start and expiration of the station manifest 202 along with subsections for each content station. As will be discussed further below, the time can be used to check that the information contained within the station manifest is current and expire the station manifest. Each station is included in the station manifest by including a station identifier 206 and, optionally, a station description 207. Pieces of content are associated with content stations 206 within the manifest by including a content identifier 208 for each piece of content within the section of a content station. Information can be provided with the pieces of content in a manner similar to a program guide for direct broadcast content by including content descriptions 209 with the content identifiers 208. A content identifier may be accompanied with a link or reference to an associated content file or content manifest that can be used to access the content, e.g., a web address or uniform resource locator (URL) for its location. Alternatively, a content identifier itself may be a link or reference to a content file or content manifest. The station manifest can specify a playback start time and a playback end time for each piece of content. In many embodiments, a playback device is configured such that a user instruction to navigate to the content station at a current time that is between the playback start time and the playback end time of a piece of content will cause the playback of that content. In several embodiments, one or more jump points are associated with a specific piece of content where each jump point references a specific time or location within the content. Jump points can be stored as jump point information that includes a jump point identifier 210 and a time stamp 211 relative to the start of the content (or any other measurement of position within the content). In some embodiments, a playback device is configured such that a user instruction to navigate to the content station at a current time that is within a range of the time associated with the jump point 210 will cause playback of the content from the jump point. In certain embodiments, a playback device can generate a station manifest 202, determine playback times for specific pieces of content 208 and assign jump points 210 to specific times based upon the content of the manifest and/or any of a variety of criteria including user preferences, time zone and/or any other factor appropriate to the requirements of a specific application.

In a number of embodiments, a content manifest can be used in rapid content switching processes in a manner similar to a "chunk manifest" or "playlist" in certain adaptive bitrate streaming technologies. For example HLS uses an m3u8 playlist and DASH uses a file with XML structure.

In several embodiments, a content manifest can be accessed by a reference within a station manifest and can contain the location of at least one content file associated with a piece of content and the locations of multiple content files where each file contains the same perceivable video content encoded at different bitrates. A content manifest can also contain metadata or properties of the content or the content files. A content manifest may be a collection of files. A playback device can utilize a content manifest to identify and locate which of the chunks (or other units/portions of encoded content pursuant to the relevant standard) encoded at different bitrates to request based upon the present streaming conditions (such as but not limited to network bandwidth and CPU capacity). Locations within the desired content file can be determined using a content manifest associated with the desired content file. In a number of embodiments, the location of a content manifest can be found using information contained within a header of a desired content file (e.g. the content manifest is referenced in the header). In several embodiments, different formats of content manifests (e.g. from different types of adaptive bitrate streaming systems) can be combined in a station manifest. In some embodiments, a playback device can buffer current content starting from a location found using the content manifest. While specific structures and contents of a station manifest are described above, any of a variety of structures and contents of a station manifest can be utilized to play back content in accordance with embodiments of the invention. Sources of content for playback are described below.

Content Sources

Content that is associated with stations in accordance with embodiments of the invention can be acquired from a variety of sources. Content can come from existing content producers that provide content for TV stations. Other content sources include can User Generated Content (UGC) that has been uploaded by individuals to websites like YouTube.com or vimeo.com. This content can be reformatted to work in the framework described here or can be directly included in a station manifest and buffered as described here.

Other sources of potential content are freely available collections assembled in podcasts or available for download. Examples include TED videos, available at www.TED.com.

Trailers for motion picture content are another source of potential content lineup. They are well suited to give an impression of the content while the ability to quickly change to another trailer in accordance with embodiments of the invention is useful to quickly evaluate a number of content pieces.

Specific televised events (such as sporting events) can be included in a station lineup. For example, a number of parallel events of the Olympic Games or parallel football games can be played in different stations so they can be used to switch back and forth. In these cases it may be desirable for jump points to be located closer together as this type of content is similar often closer to live broadcasting, wall clock time is relevant, and when returning to a station the user will expect different content.

In many embodiments of the invention, content conforms to some characteristics, requirements, and/or formatting to avoid resetting or reconfiguring the decoder in a playback device when switching content. For example, content may use a common codec, encryption mechanism, frame rate, container format, and/or metadata format. Uniformity of content may be governed by a standardization or certification entity. Conversion of websites to be video content sources is discussed below.

Websites as Video Content Sources

Websites can be converted into an image, formatted into a video stream, and delivered to a video display system such as a rapid content switching system or other video distribution systems such as IPTV (Internet Protocol Television) or cable TV. This conversion from a browser screen shot to a video stream in accordance with embodiments of the invention is in particular applicable to websites that contain mostly static information and no relevant video or audio content. Websites that contain real time information should be updated according to the frequency that their information changes.

Figure 4:
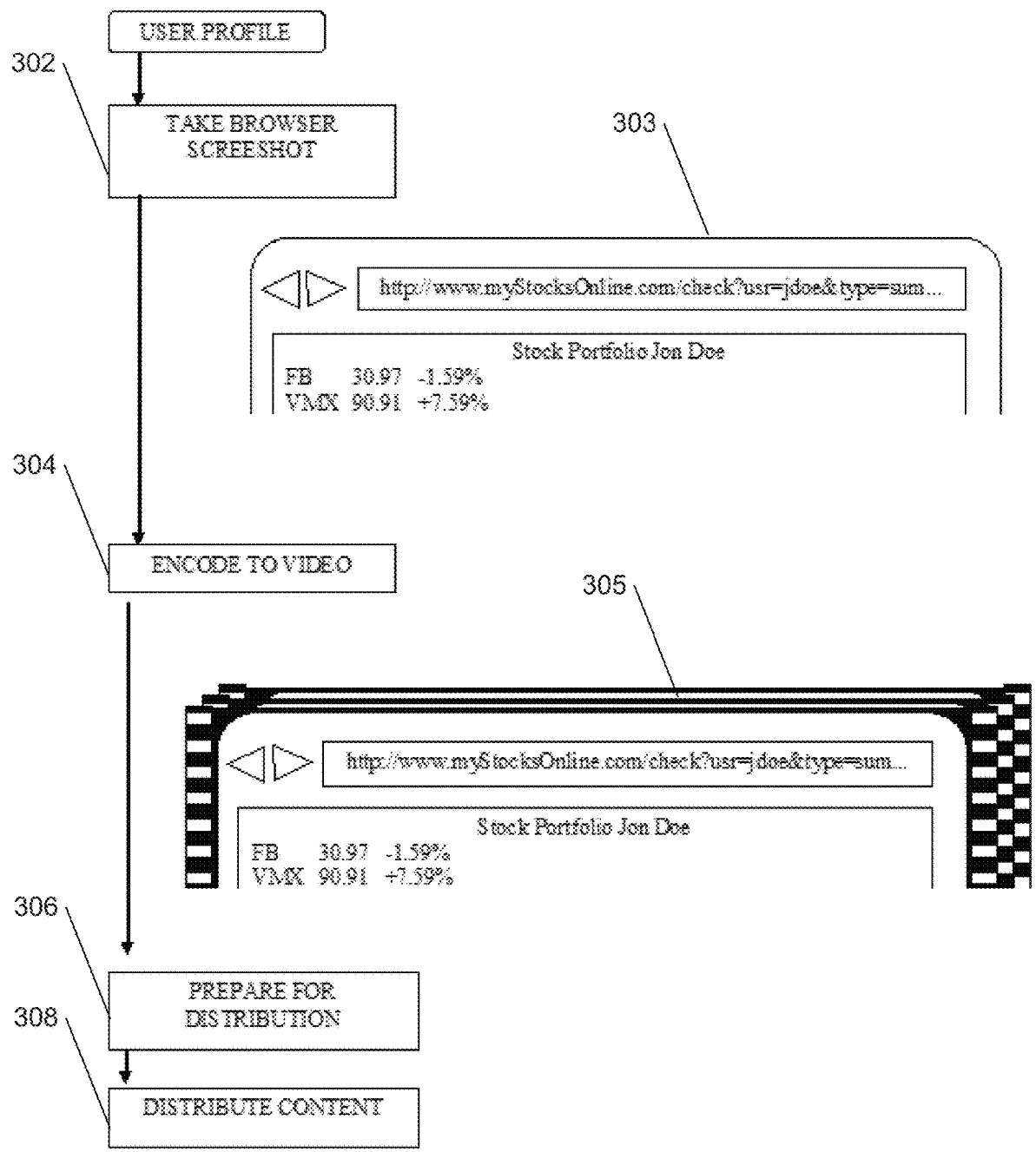
FIG. 4 is a flow chart illustrating a process for converting a website into a video content source in accordance with embodiments of the invention.

A process for converting a website into a video content source in accordance with embodiments of the invention is illustrated in FIG. 4. The content of the website is configured by the user though an interface that may be provided on a configuration website, where the user is provided the ability to enter the content URLs and optionally a user name and password. The service may be preconfigured for popular information sources such as, but not limited to, weather (where the user only needs to provide a location by zip code), Facebook and Twitter (where the user provides a username and password) and photo sharing (where the user provides a username, password and selects a name of an album).

The configuration is stored in a user profile. The system in the back end will access the website in regular intervals and capture (302) the visual content of the website as an image of the website 303 as it would be displayed in a web browser. The image is then converted (304) into a video stream composed of frames 305, all of which contain the visual content. The resulting video is formatted (306) to be distributed or made available for a distribution system like adaptive bitrate streaming, cable or IPTV (internet protocol television) and delivered (308) to the individual user in the same fashion as a TV channel or VOD (video on demand) asset, such that the receiving equipment, designed to play video content, does not require any modification to display the website but is actually receiving and decoding video while displaying the contents of a webpage. The video can also be utilized in the systems providing for playback of content with rapid content switching as described here in accordance with embodiments of the invention. Processes for rapid content switching in accordance with embodiments of the invention are discussed below.

Processes for Rapid Content Switching

Figure 5:
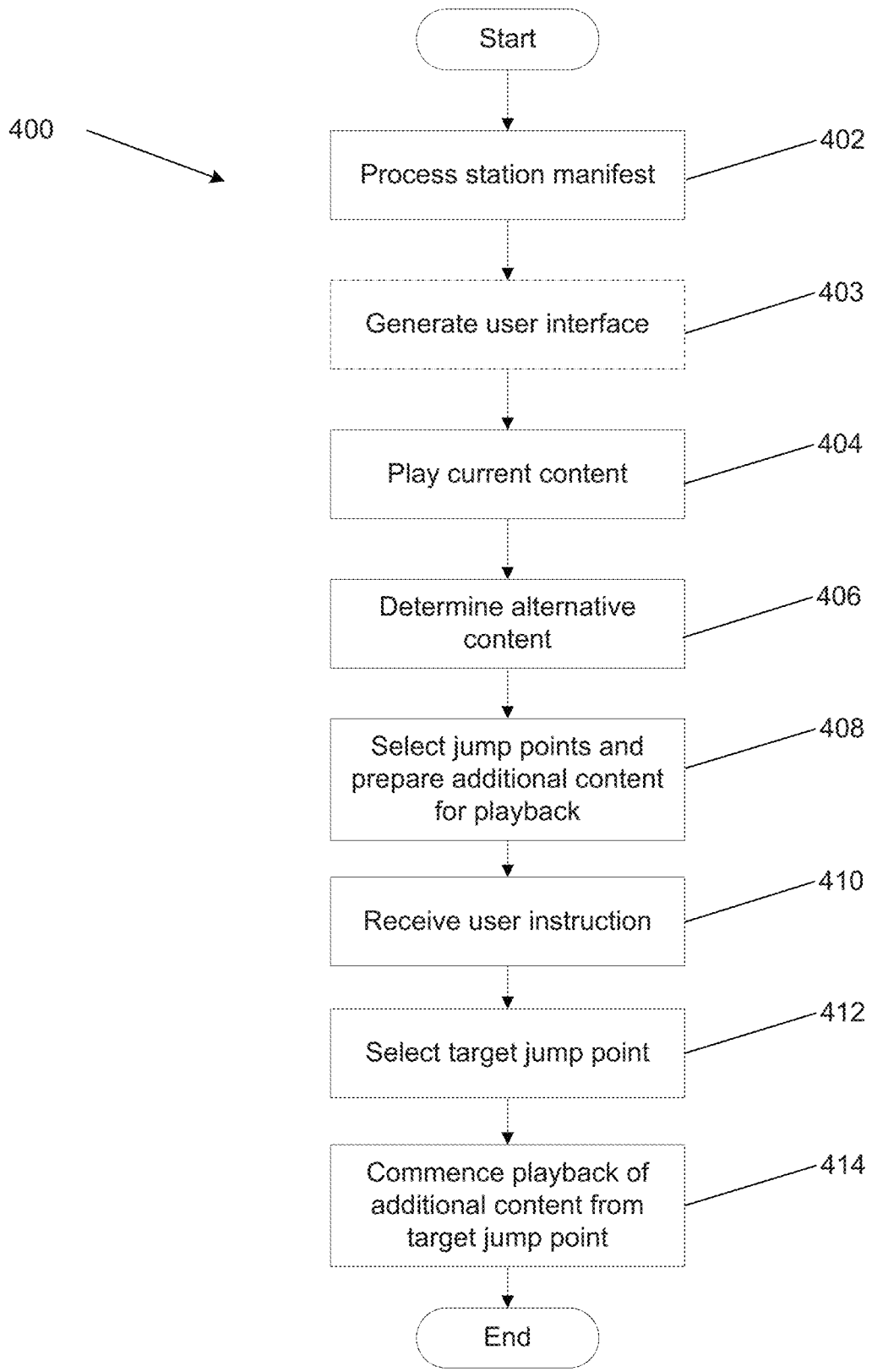
FIG. 5 is a flow chart illustrating a process for rapid content switching in accordance with embodiments of the invention.

In many embodiments of the invention, a playback device performs a process for rapid content switching to provide a user with a linear TV experience using streaming content distribution. A process performed on the playback device for rapid content switching in accordance with embodiments of the invention is illustrated in FIG. 5.

The process 400 includes processing (402) at least a portion of a station manifest. The station manifest may be generated by the playback device, received from a server, or provided by another source. As discussed further above, a station manifest can include a list of stations available for a user to view. Stations may be listed as station identifiers and station descriptions. The station manifest can also include content identifiers, content descriptions and/or references to pieces of content associated with the stations as well as the scheduled viewing time assigned to each piece of content. In several embodiments, the station manifest includes a link to a content manifest for each piece of content. In some embodiments, content identifiers are links to content manifests. A set of available jump points may be included in the station manifest, may be downloaded from another server, or may be generated by the playback device.

The process can include generating (403) a user interface that displays information from the station manifest such as, but not limited to, a station lineup of stations available to the user to view (e.g. using station identifiers and station descriptions), the content showing on each station (e.g. using content identifiers and content descriptions), and the time slots associated with each piece of content.

At least a portion of a current piece of content is played back (404). Content playback may utilize a content manifest in the station manifest. For example, in adaptive bitrate streaming systems, a content manifest contains information including the bitrates and locations of alternative streams of the content. The current piece of content is designated "current content." The current content may be predetermined (e.g., by device settings or user preferences or reverting to last content played by the device) or may be selected by the user (e.g., via the user interface), and may be determined based on the current time and content that is scheduled for playback at the current time. The "current content station" is the station with which the current piece of content is associated.

The process determines (406) alternative content. "Alternative content" (or "alternative pieces of content") is content different from the content the user is currently watching (current content) and that is accessible using the station manifest. It may be content that is in at least some of the stations other than the station the user is currently watching. It may also include content in the current content station scheduled for playback at a different time than the content that is currently playing, which is within the same piece of content or a different piece of content in the current content station. In many embodiments of the invention, alternative content includes content in one or more stations that are adjacent to the current station in the station lineup and that is scheduled to play back at the current time. For example, alternative content can be in the two stations higher and the two stations lower than the current station. Alternative content can be determined using station identifiers and content identifiers from the station manifest, e.g., by determining neighboring stations with station identifiers close to the current content station and identifying the content identifier of content associated with each station for playback at a particular time.

While current content is being played back, the process prepares (408) additional content for playback at selected jump points. The set of jump points at which content is prepared can be determined or selected from the available jump points based on factors such as, but not limited to, the current time (selecting jump points close to the current time), current station (selecting jump points in content in stations adjacent to the current station), and available resources such as bandwidth (determining how many jump points to buffer or bitrate). Additional content that is prepared can be portions of the current content other than the portion currently being played and/or alternative content. Preparing alternative pieces of content can include buffering at least a portion of each piece of alternative content. In several embodiments, buffering can start from a jump point in each piece of alternative content, e.g., one is close to the current time. The buffering of alternative content can utilize techniques and optimizations discussed further below. In various embodiments, preparing additional content includes retrieving (or pre-fetching) information utilized in decoding the alternative content such as, but not limited to, metadata such as thumbnails, subtitles and content description as well as content manifests, and digital rights management (DRM) licenses and/or cryptographic information (e.g. decryption keys). A rapid switch to additional content can also be prepared for by implementing another render window and another decoding instance for the new content at the time of switching.

Figure 6:
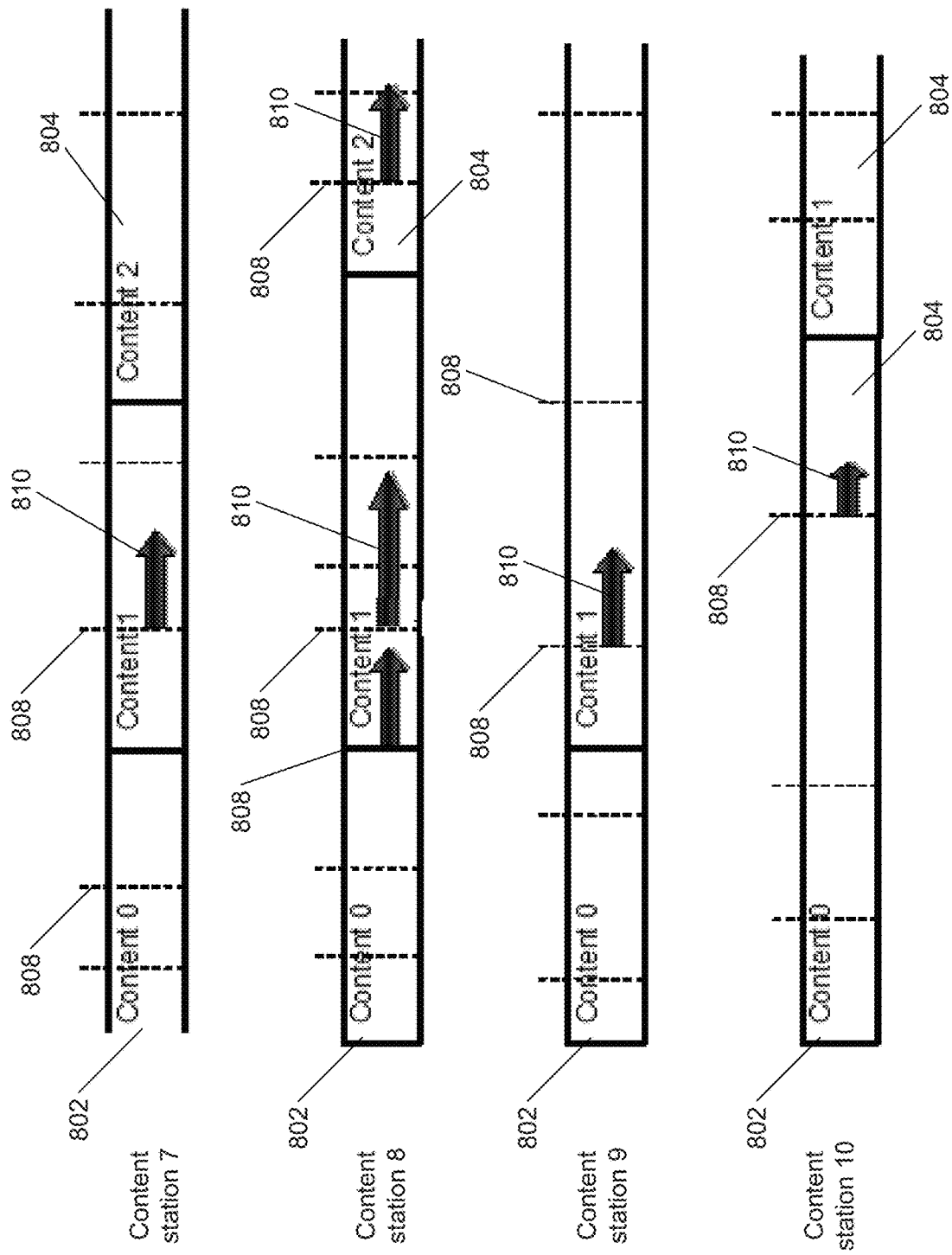
FIG. 6 conceptually illustrates content stations and buffered amounts of content at various jump points in accordance with embodiments of the invention.

A conceptual illustration of buffered amounts of additional content for different content stations from various jump points in accordance with embodiments of the invention is illustrated in FIG. 6. The grid of content stations shows the station lineup of virtual, customized stations 802 and associated pieces of content 804 with jump points 808.

Arrows 810 indicate the priorities for buffering with the length of the arrows. Priorities can be set by the likelihood of a request to play back the buffered content. Priority can determine the amount of content to be buffered, but also the bitrate: higher priority buffers can be filled with a higher bitrate. In many embodiments, the highest priority is for the current content, i.e., the program that is being watched, as this is most likely to be played out next. The following priorities are for neighboring stations and previous and next piece of content as the user may decide to change stations, skip to the next piece of content or jump to the beginning of the current piece of content to watch from the beginning.

Referring again to the process illustrated in FIG. 5, a user instruction is received (410). The user instruction can be received while content is being played back. The user instruction can be, for example, pressing a channel/station up or down button on a remote or selecting a channel/station from the on-screen user interface. A station change instruction may be interpreted as selecting an alternative piece of content in another station. The user instruction can also be forward and backward to jump to different locations within a piece of content or to a different piece of content in the current station. Other user instructions include a "replay," "repeat," or "play from beginning" instruction that requests playback from a specific point in the current piece of content. A target jump point is selected (412) based upon the user instruction. The target jump point may be in the same piece of content or in an alternative piece of content depending on the type of user instruction. Playback is commenced (414) from the selected target jump point. While a specific process for rapid content switching is discussed above with respect to FIG. 5, a variety of processes for rapid content switching can be performed in accordance with embodiments of the invention. The features and actions described above may occur in a different order and in sequence or in parallel. The process may be performed in whole or in part by a playback device with memory containing instructions to perform the process.

Figure 7:
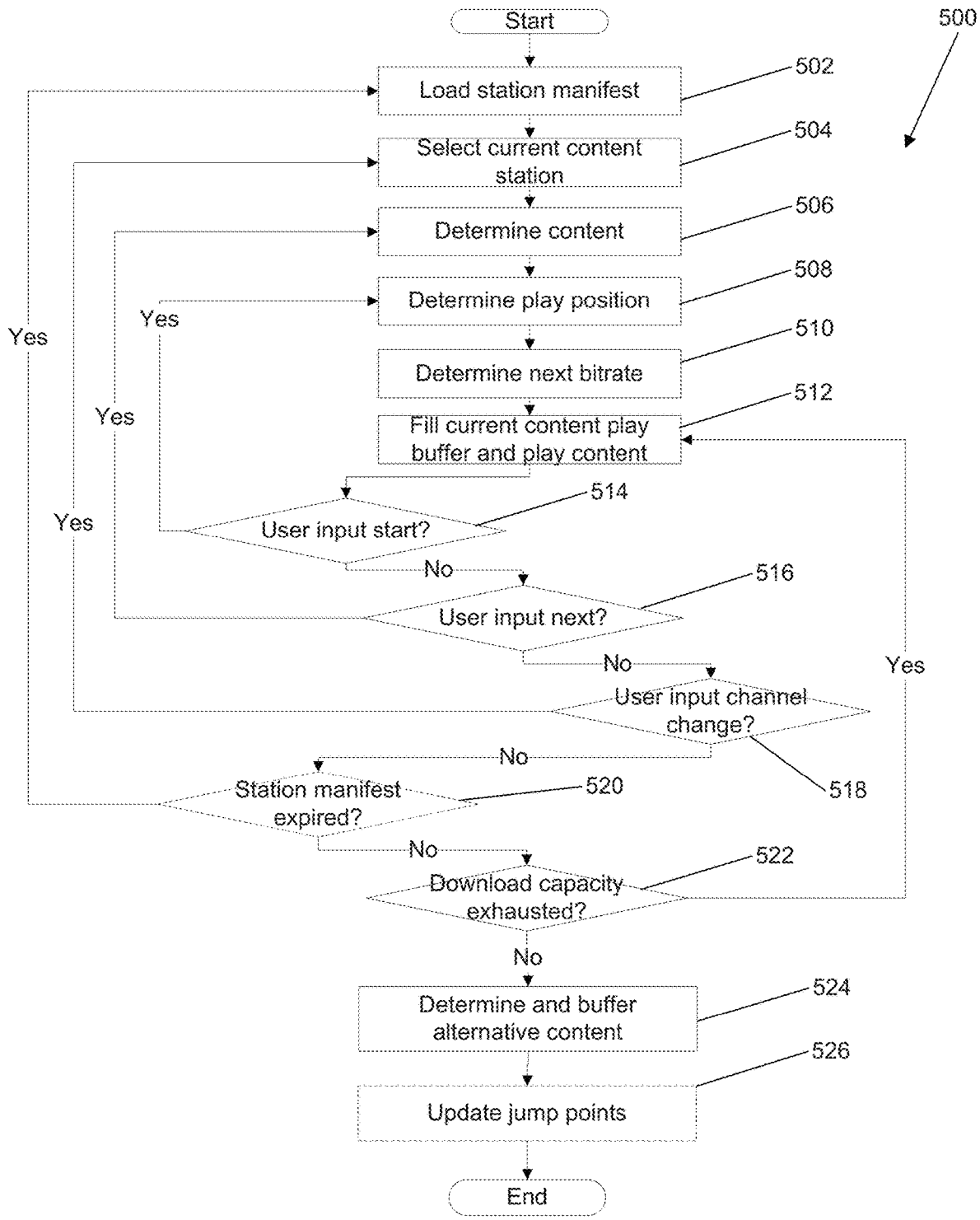
FIG. 7 is a flow chart illustrating a process for rapid content switching with specific types of user instructions in accordance with embodiments of the invention.

In several embodiments of the invention, specific user instructions can determine how playback is commenced following the user instruction. A process for rapid content switching with specific types of user instructions in accordance with embodiments of the invention is illustrated in FIG. 7.

The process 500 includes loading (502) a station manifest. A set of jump points associated with locations in pieces of content that are associated with stations in the station manifest may be included in the station manifest, may be stored in a separate file, or generated from rules applied to the content pieces. A content station can be selected (504) that includes a number of pieces of content scheduled to be presented at particular times. A piece of content can be selected (506) via a user interface from the pieces of content presented in a content station based upon external information such as, but not limited to, the current time. The content may alternatively be predetermined, e.g., reloading the last station or piece of content being played when the device was shut off or automatically selecting content based on a user's preferences. A playback location within a file containing an encoded copy of the requested content can be determined (508) using a jump point having an associated time equal to or prior to the current time. A content manifest can provide access to a number of content files that include various versions of the requested content at various bitrates. As noted above, the content manifest can also identify files containing additional tracks of media including audio tracks and/or subtitles. A bitrate appropriate to the streaming conditions is selected (510) from the set of available bitrates for the content based on factors such as, but not limited to, bandwidth and device capabilities. Portions of the content encoded at the selected bitrate (e.g., chunks in certain video standards) are downloaded and buffered (512) for playback.

User instructions can be received from a user via a variety of types of input such as, but not limited to, a remote control, an on-screen control panel, or an interactive user interface. If a user instruction requests (514) to jump to the start of the current piece of content, the play position is updated (508) to a jump point that is associated with the start of the current piece of content. Similar user instructions may indicate jumping to other jump points within the content such as, but not limited to, the next scene or back 5 minutes. If a user instruction requests (516) to jump to the beginning of the next piece of content within the current content station, the current content is updated (506) to the next piece of content and a new play position is determined as the jump point that is associated with the start of the next piece of content. If a user instruction requests (518) to change to a different content station (e.g., by a channel/station up or down command or by selecting a station via the user interface), the current content station is updated (504) to the new content station and a new play position is determined as the jump point within a piece of content that is associated with the current time or within a certain range of the current time.

The station manifest can be evaluated at regular intervals to determine if it should be reloaded to keep the station and/or content lineup current. The new station manifest may append to or overlap with the previous manifest such that information is added to existing station lineup information and no gaps in information are perceived by the user. The station manifest may expire (520) based upon one or more factors such as, but not limited to, the lapse of a set amount of time from loading the current station manifest or the lack of forward jump points in the current station manifest. If there is a determination that the station manifest has expired, then a new station manifest is loaded (502). While playback continues, if download capacity (i.e., playback buffer) of the current content in the desired quality has been exhausted (522) or is close to being exhausted, additional portions of content are downloaded and placed (512) in the buffer.

Alternative content is determined and buffered (524). In many embodiments of the invention, alternative content includes content in neighboring stations (adjacent to the current station). In further embodiments, the alternative content is buffered from jump points close to the current time.

When there are available local resources and bandwidth, the set of available jump points can be updated and/or the buffer for storing jump points can be increased to allow faster response after repeated user input. The process can evaluate available local resources and bandwidth and update (526) the current jump points and/or increase the jump point buffer. In many embodiments, playback (512) of the current content takes place concurrently and has precedence over updating the jump points and prefetching content at jump points. If the current content playback does not allow for updates of jump points over an extended period of time, the quality or bitrate of the current content may be decreased (e.g. by requesting a lower bitrate stream) to allow for more available resources to update jump points.

While a specific process for rapid content switching with specific types of user instructions is discussed above with respect to FIG. 7, a variety of processes for rapid content switching can be performed in accordance with embodiments of the invention. The features and actions described above may occur in a different order and in sequence or in parallel. The process may be performed in whole or in part by a playback device with memory containing instructions to perform the process.

Figure 8:
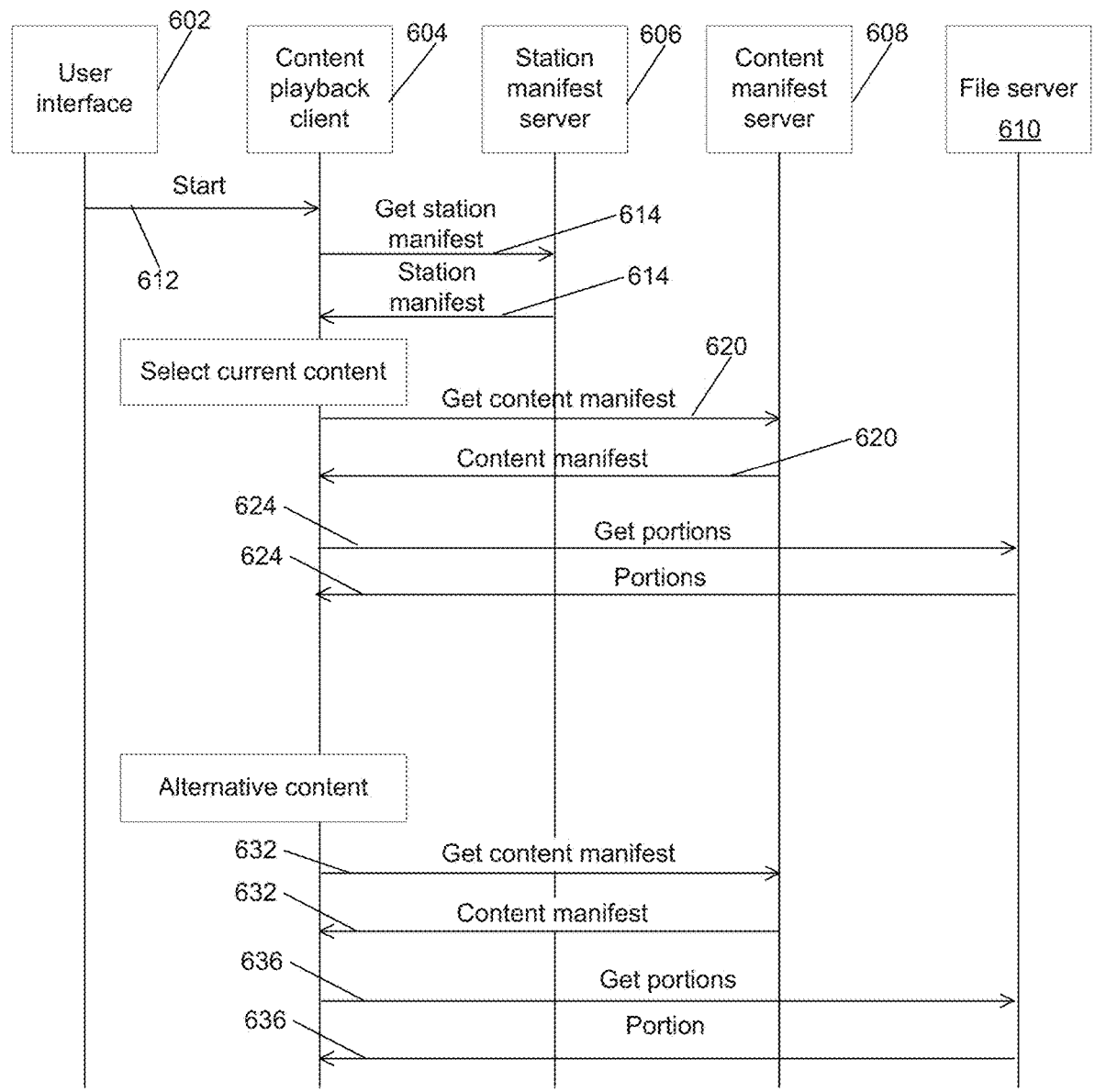
FIG. 8 is a timing diagram illustrating a process for rapid content switching in accordance with embodiments of the invention.

A timing diagram illustrating a process for rapid content switching in accordance with embodiments of the invention is illustrated in FIG. 8. The timing diagram illustrates a sequence of interactions between a playback device 604, station manifest server 606, content manifest server 608, and file server 610. The servers 606, 608, and 610 may be separate devices or any number of the servers may be combined into one device. A playback device 604 can be initialized (612) from an instruction received via a user interface 602 generated by the playback device. The playback device can request and receive (614) a station manifest from a station manifest server. The user can indicate selection of a current piece of content via a user interface or other input method (such as a remote control).

The playback device can request and receive (620) a content manifest associated with the current content from a content manifest server. The playback device can utilize information in the content manifest to determine an appropriate jump point and chunk in the current content that has a desired bitrate determined from current conditions such as, but not limited to, local resources and bandwidth. The playback device can request and receive (624) portions (e.g. chunks) of the file and buffer them for playback. In several embodiments, buffering commences from a jump point determined by a user instruction or the current time.

Using the station manifest, a playback device can also determine alternative content to buffer. The playback device can request and receive (632) a content manifest associated with the alternative content from a content manifest server. The playback device can utilize information in the content manifest to determine an appropriate content file associated with the current content and that has a desired bitrate determined from current conditions such as, but not limited to, local resources and bandwidth. The playback device can request and receive (636) the appropriate portions (e.g. chunks) of the file and buffer them for playback. Retrieving a content manifest (632) and portions of content (640) may be repeated when jump points are updated. In several embodiments, buffering commences from a jump point determined by the current time. In some embodiments of the invention, pieces of alternative content may be stored on file servers that are not the same as the servers storing the current content and so there may be more file servers 610 with which the playback device communicates. In other embodiments, different pieces of content may be stored on the same file server 610. While a timing diagram for a specific process for rapid content switching is discussed above with respect to FIG. 8, a variety of processes for rapid content switching can be performed in accordance with embodiments of the invention.

Buffering Alternative Content and Visual Indication on a User Interface

As discussed above, buffering alternative content while playing a current content can allow for more responsive playback when changing to an alternative content location. In several embodiments of the invention, the alternative content that is buffered is from a lower quality or lower bitrate stream than the current content to limit the bandwidth used. In further embodiments, the bitrate for buffering from a jump point is chosen based on the likelihood that the jump point will be selected by a user instruction. For example, a station that is closer to the current station may be determined to be likely to be chosen by a station change instruction and is buffered at a higher bitrate than a station that is further from the current station. In other embodiments, alternative content at the same or similar bitrate to the current content is buffered.

After a station change, when new content (previously alternative content) begins playing, metadata about that content can be displayed such as, but not limited to, name and genre of the content, the year and language, user rating and content source. This can provide the user with quick evaluation of the content and relieve the user from noticing a reduction in image quality when a lower quality/bitrate stream of alternative content is buffered and being played back.

In some embodiments of the invention, advertisements (ads) may be used to generate a revenue stream for the provider of the system and/or content. In various embodiments, ads can be displayed under different conditions. Ads may be pre buffered and displayed, for example, when the playback buffer is exhausted and the current station cannot yet be displayed or the current content is loading too slowly. Ads may also be displayed in regular intervals or a predetermined time after a station or piece of content has been watched. Ads may be targeted to the contents of the station or the user preferences explicitly provided or implicitly determined. An advertisement image may be displayed when the current content is paused.

In many embodiments of the invention, a user interface displays the choice of content available to a user at any given time (including at the current time) in a grid that shows the station lineup from a station manifest and content associated with each station. In some embodiments, alternative content buffered at jump points may be included in this grid to visualize the amount and location of content immediately available for playback without additional buffering and delays in playback.

Figure 9:
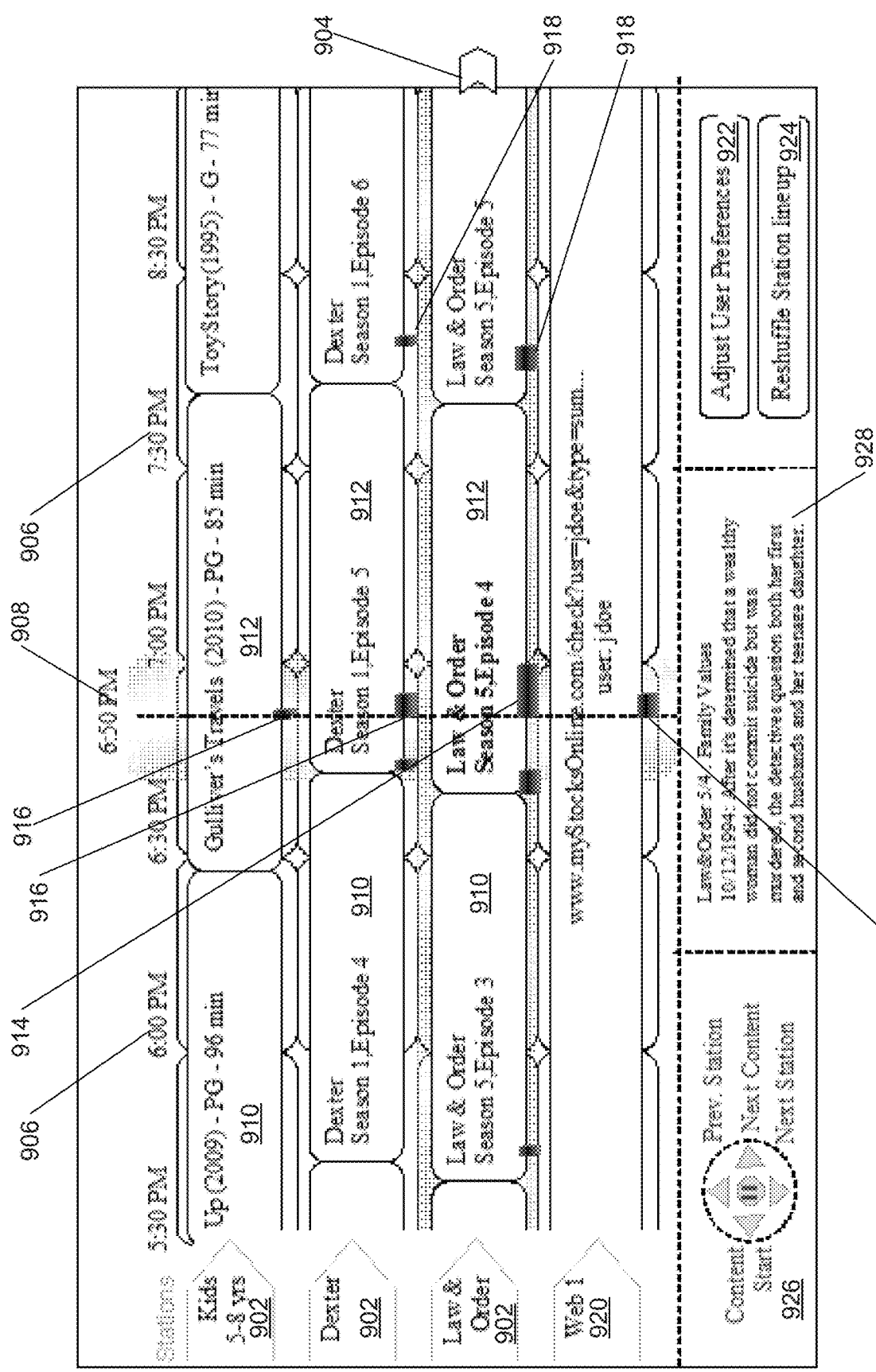
FIG. 9 illustrates a user interface showing content stations with visual indicators of buffered alternative content in accordance with embodiments of the invention.

A user interface in accordance with embodiments of the invention is illustrated in FIG. 9. The grid displays at least some of the stations 902 available to the user around the station currently playing (indicated by arrow 904) along with an index of time intervals 906 close to the current time (indicated by a highlighted bar 908). The station information 902 can display a station identifier and/or station description from a station manifest. Pieces of content can be displayed in boxes 910 and 912, indicating start and end times by its alignment to the time index 906 together with a description of the content. The content identifier and/or content description from the station manifest can be displayed in the boxes. The current play position is marked at the current time 908 and the buffer progress of the current content can be visualized by an indicator bar 914 with length showing the amount of content buffered. Alternative content in other stations is buffered as visualized by indicator bars 916 at jump points near the current time and indicator bars 918 at jump points in next pieces of content. Here the buffer is prepared for two potential user inputs of station up and station down with decreased buffer size on the second input. The web station 920 is only buffered at one jump point. Some stations may be continuously buffered, e.g. those that display web pages 920. The bottom of the interface may include adjustment options 922 and 924 as well as a guide for possible user input 926 and a description of the currently selected content 928.

In the embodiment illustrated, as the content is played back only the content currently playing continuously advances in time. The other stations may not continuously move with time passing while playing the current station but remain at the location to be able to play the buffered alternative content at a jump point whenever a station change occurs without having to continuously update the buffer at the jump points. After a predetermined time, alternative content on stations that are not currently playing can advance to a new location and commence buffering alternative content at a new jump point closer to the current time. For stations that are not visible in the grid this update may occur more infrequently such as during restart of the player or when the current station is changed to be closer to those stations. While specific user interfaces for viewing content for rapid content switching are discussed above with respect to FIG. 9, a variety of user interfaces for rapid content switching can be implemented in accordance with embodiments of the invention.

Buffer Optimization

Buffering a number of jump points may reduce the bandwidth available to download the current content. It can be useful to reduce the number of jump points and the bitrate at which they are buffered. In many adaptive bitrate streaming solutions, content is encoded in several different bitrates in alternative streams so that a lower bitrate is available for buffering in embodiments of the invention without having to prepare and store additional content. This tradeoff on the number of jump points to buffer and the buffer quality can be configured on the client depending on streaming conditions.

Similarly, buffering a greater number of neighboring stations uses more bandwidth. However, this allows more channel changing operations within a short period of time without getting to a channel that is not pre-buffered for immediate playback.

The cache of a content delivery network (CDN) server can be utilized to provide efficiencies in buffering content in accordance with embodiments of the invention. The cache holds content that is requested frequently and has the ability to quickly deliver it. By combining the content and jump points of several users, such that they are requested more frequently at a similar time, the use of this cache can be optimized.

To optimize the cache use, stations (station lineup) and jump points can be unified to be the same among different users and therefore will be requested more often than other content, because it is buffered even if it is not watched, i.e. no channel change occurred. On higher level of optimizations, new stations can be created that contain content that is already watched by other users served from the same server so as to encourage the delivery of the same files to several users.

Audience Measurement

Any user input, direct and indirect as well as user behavior may be monitored and aggregated at the head end. This includes actions such as switching a channel that can be aggregated and used to determine the popularity of all sections in the content: high if fewer users change the station and low if many users switch to another station at the section of the content. This can be used not only to determine the jump points for other users or stations but also to provide feedback to the content owners and creators. This does not only apply to the content presentation described here but also to other content playback systems.

Although the present invention has been described in certain specific aspects, many additional modifications and variations would be apparent to those skilled in the art. It is therefore to be understood that the present invention may be practiced otherwise than specifically described, including various changes in the implementation. Thus, embodiments of the present invention should be considered in all respects as illustrative and not restrictive.

What is claimed is:

1. A method for rapid content switching between pieces of content presented in a plurality of stations using streaming content distribution, comprising:
   processing at least a portion of a station manifest using a playback device, where the station manifest comprises:
      identifiers for a plurality of content stations; and
      identifiers for a plurality of pieces of content, where each piece of content is associated with at least one content station;
   selecting a plurality of jump points using the playback device, where each jump point is associated with a specific location within a piece of content;
   determining a current content station from the plurality of content stations using the playback device;
   playing at least a portion of a current piece of content associated with the current content station from the plurality of pieces of content using the playback device;
   determining a plurality of alternative pieces of content from the plurality of pieces of content using the station manifest using the playback device;
   preparing additional content for playback at each of the plurality of jump points by preparing alternative pieces of content during playback of the current piece of content using the playback device;
   receiving a user instruction during playback of the current piece of content using the playback device;
   selecting a target jump point from the plurality of jump points based upon the received user instruction using the playback device; and
   commencing playback of prepared additional content starting from the selected target jump point using the playback device.

2. The method of claim 1, wherein the selected target jump point is associated with a specific location within an alternative piece of content.

3. The method of claim 1, wherein the selected target jump point is associated with a specific location within the current piece of content.

4. The method of claim 1, wherein preparing additional content for playback comprises buffering at least a portion of each of the plurality of alternative pieces of content using the playback device.

5. The method of claim 4, wherein buffering at least a portion of at least some of the plurality of alternative pieces of content using the playback device comprises buffering alternative content starting from a jump point in each alternative piece of content.

6. The method of claim 5, further comprising determining the likelihood that certain jump points will be selected by a user instruction and wherein buffering alternative content starting from a jump point in each alternative piece of content further comprises buffering a stream of the alternative piece of content whose bitrate is related to the likelihood a jump point in the alternative piece of content will be selected.

7. The method of claim 5, wherein the number of jump points at which alternative content is buffered and the bitrate of the alternative content that is buffered are related to the current available bandwidth.

8. The method of claim 1, wherein preparing additional content for playback further comprises preparing the current piece of content.

9. The method of claim 1, wherein preparing additional content for playback comprises downloading at least one content manifest associated with an alternative piece of content.

10. The method of claim 1, wherein preparing additional content for playback comprises downloading metadata associated with an alternative piece of content.

11. The method of claim 1, wherein preparing additional content for playback comprises pre-fetching cryptographic information that can be used to decrypt alternative pieces of content.

12. The method of claim 1, wherein the current piece of content is determined based upon the current content station and a current time; and
wherein determining a plurality of alternative pieces of content using the playback device further comprises determining a plurality of alternative pieces of content based upon the current content station and the current time.

13. The method of claim 1, further comprising generating a user interface listing at least some of the plurality of content stations and at least one piece of content associated with each listed content station using the playback device; and
wherein receiving a user instruction using the playback device comprises receiving a user instruction via the interactive user interface that identifies a listed piece of content.

14. The method of claim 1, wherein the identifiers for a plurality of pieces of content are references to content manifests, where a reference to a content manifest is associated with each piece of content.

15. The method of claim 1, wherein the station manifest further comprises a plurality of references to content manifests, where a reference to a content manifest is associated with each piece of content.

16. The method of claim 1, wherein the station manifest further comprises a plurality of jump points, where each jump point is associated with a specific location within a piece of content.

17. The method of claim 1, further comprising requesting a station manifest from a station manifest server using the playback device.

18. The method of claim 17, wherein the station manifest is generated based a user profile.

19. The method of claim 17, wherein the station manifest is generated based on the current time.

20. The method of claim 1, further comprising updating the plurality of jump points periodically.

* * * * *